US007187658B2

(12) United States Patent
Koyanagi et al.

(10) Patent No.: US 7,187,658 B2
(45) Date of Patent: Mar. 6, 2007

(54) DATA TRANSMISSION APPARATUS SELECTING EFFICIENT NETWORK OR SERVICE CLASS

(75) Inventors: Hisako Koyanagi, Kawasaki (JP);
Michio Kusayanagi, Kawasaki (JP);
Jun Tanaka, Kawasaki (JP); Tomohiro Ishihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 907 days.

(21) Appl. No.: 09/775,975

(22) Filed: Feb. 2, 2001

(65) Prior Publication Data

US 2001/0013067 A1    Aug. 9, 2001

(30) Foreign Application Priority Data

Feb. 4, 2000    (JP)    ............... 2000-028432

(51) Int. Cl.
*H04L 12/28*    (2006.01)
*H04L 12/66*    (2006.01)
*G06F 15/16*    (2006.01)
(52) U.S. Cl. ............ 370/254; 370/351; 370/389; 370/401; 709/220; 709/223; 709/238; 709/249
(58) Field of Classification Search ............... 370/392, 370/252, 389, 396, 397, 395.21, 395.31, 370/395.42, 395.43, 230, 235, 254, 395.1, 370/395.4, 400, 401, 409, 352, 351; 709/220, 709/223, 224, 230, 238, 240, 249
See application file for complete search history.

(56) References Cited

U.S. PATENT DOCUMENTS

| 5,392,344 | A | * | 2/1995 | Ash et al. ............... 379/221.07 |
| 5,477,531 | A | * | 12/1995 | McKee et al. ............... 370/249 |
| 5,948,069 | A | * | 9/1999 | Kitai et al. ................. 709/240 |
| 6,115,713 | A | * | 9/2000 | Pascucci et al. ............... 707/10 |
| 6,529,483 | B1 | * | 3/2003 | Itjeshorst ................... 370/259 |
| 6,590,867 | B1 | * | 7/2003 | Ash et al. .................. 370/236 |
| 6,631,122 | B1 | * | 10/2003 | Arunachalam et al. ..... 370/332 |
| 6,738,387 | B1 | * | 5/2004 | Lin et al. .................... 370/429 |

(Continued)

FOREIGN PATENT DOCUMENTS

JP    09-321795    12/1997

OTHER PUBLICATIONS

W. Richard Stevens, "TCP/IP Illustrated, vol. 1 The Protocols", Addison-Wesley, pp. 41 and 111-126.*
InterNAP Network Services, how it works, "InterNAP . . . delivering network quality without peer", Bypass Congested Peering, pp. 1-3.

*Primary Examiner*—Alpus H. Hsu
(74) *Attorney, Agent, or Firm*—Katten Muchin Rosenman LLP

(57) ABSTRACT

A data transmission apparatus is provided for transmitting data received from a user terminal device through a plurality of networks to a destination, the user terminal device executing communication using an Internet protocol. The data transmission apparatus includes a routing table storing information relating a destination address of the data and addresses of the plurality of networks; an information table storing static and dynamic information about the plurality of networks; and a selection unit selecting one or the plurality of networks, through which the data transmission apparatus transmits the data to the destination, based on the static and dynamic information. The data transmission apparatus enables data transmission through the appropriate network by selecting the appropriate network based on the static and dynamic information about the plurality of networks.

13 Claims, 41 Drawing Sheets

U.S. PATENT DOCUMENTS 6,791,949 B1 *  9/2004  Ryu et al. .................... 370/254
6,888,802 B1 *  5/2005  Golikeri et al. ............. 370/254
2001/0007560 A1 *  7/2001  Masuda et al. .............. 370/401
2002/0161861 A1 *  10/2002  Greuel ....................... 709/220

* cited by examiner

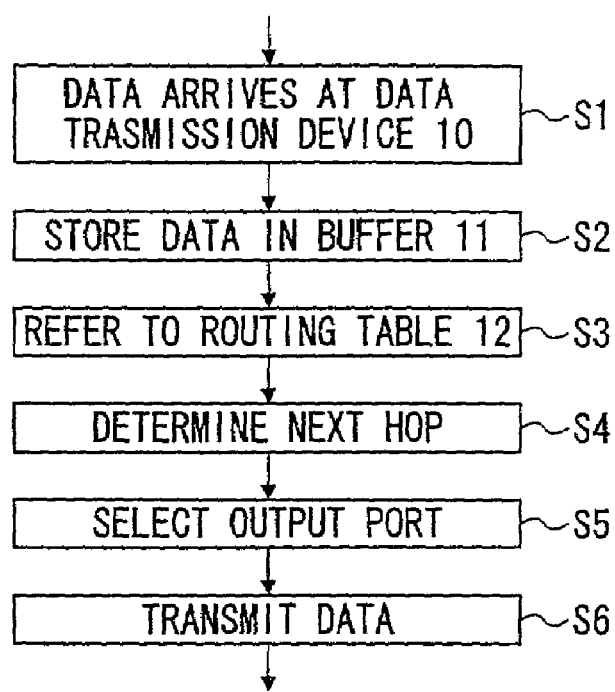

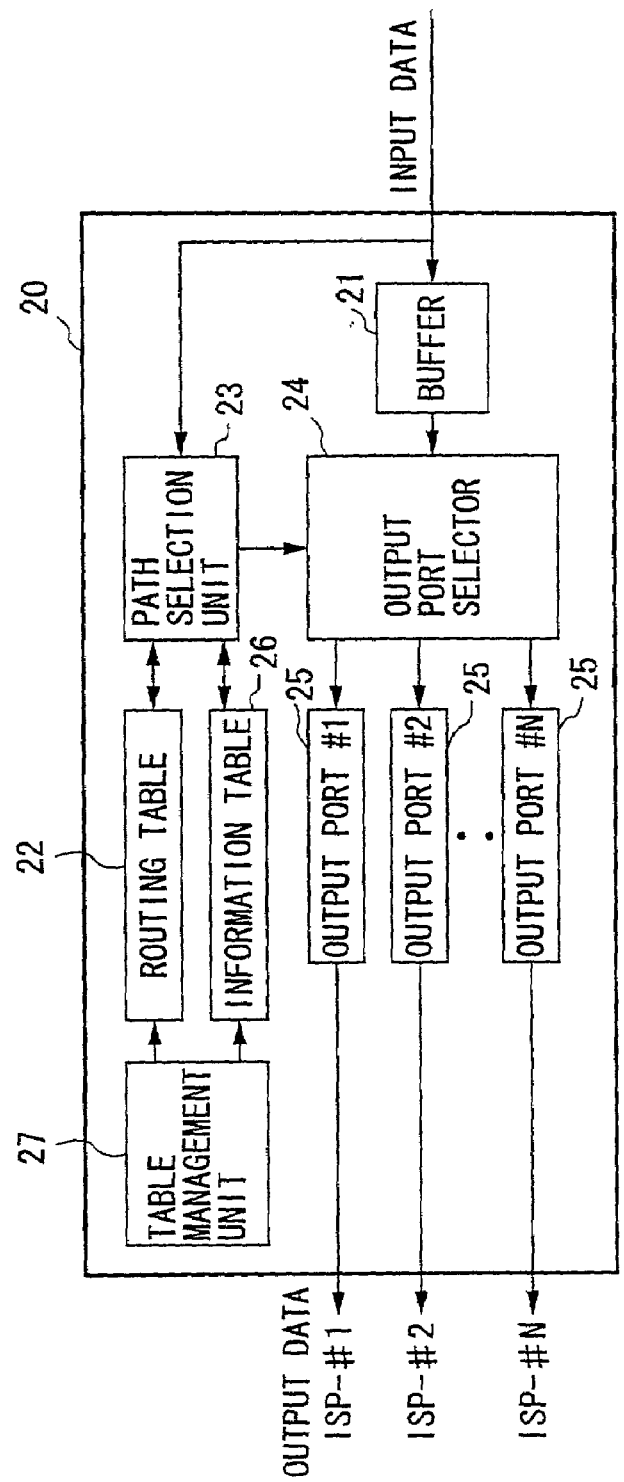

| DESTINATION | HOST/NET | NEXT HOP | OUTPUT PORT | MOST APPROPRIATE ROUTE |
|---|---|---|---|---|
| ISP-#1 | NET | a | 1 | |
| ISP-#2 | NET | c | 2 | |
| X | HOST | a | 1 | * |
| | | c | 2 | |
| INTERNET | NET | a | 1 | * |
| | | c | 2 | |

| DESTINATION | "VIA" NETWORK | MESSAGE-PACKET RETURN PERIOD | FEE INFORMATION |
|---|---|---|---|
| X | ISP-#1 | 2 | 1 |
| | ISP-#2 | 10 | 1 |

FIG.8B

| DESTINATION | HOST/NET | NEXT HOP | OUTPUT PORT | SERVICE CLASS | MOST APPROPRIATE ROUTE | |
|---|---|---|---|---|---|---|
| | | | | | SPEED | FEE |
| ISP-#1 | NET | a | 1 | | | |
| X | HOST | a | 1 | EF-PHB | * | * |
| | | | | AF-PHB | * | |
| | | | | BEST EFFORT | | * |
| INTERNET | NET | a | 1 | EF-PHB | * | |
| | | | | AF-PHB | | |
| | | | | BEST EFFORT | | * |

FIG.8C

| DESTINATION | SERVICE CLASS | MESSAGE-PACKET RETURN PERIOD | FEE INFORMATION | VALUE FOR SPEED AS FIRST PRIORITY | VALUE FOR FEE AS FIRST PRIORITY |
|---|---|---|---|---|---|
| X | EF-PHB | 1 | 20 | 22.1 | 46.4 |
| | AF-PHB | 4 | 10 | 20.9 | 27.4 |
| | BEST EFFORT | 20 | 1 | 57.0 | 26.2 |

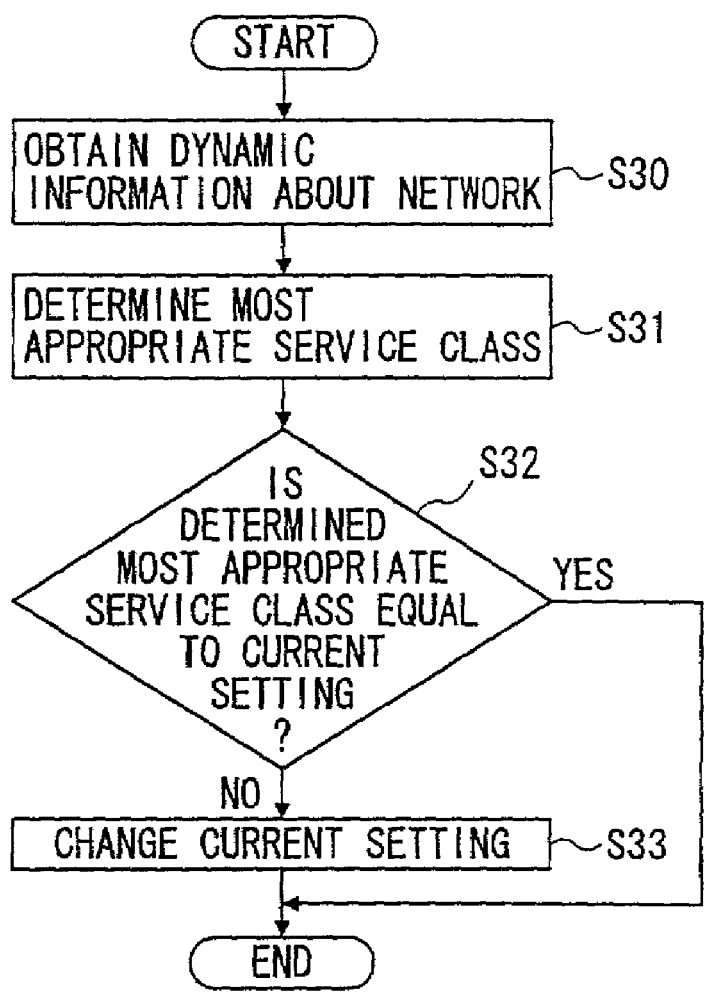

FIG.10A

| DESTINATION | HOST/NET | NEXT HOP | OUTPUT PORT | SERVICE CLASS | MOST APPROPRIATE ROUTE | |
|---|---|---|---|---|---|---|
| | | | | | SPEED | FEE |
| ISP-#1 | NET | a | 1 | | * | * |
| X | HOST | a | 1 | EF-PHB | | |
| | | | | AF-PHB | * | * |
| | | | | BEST EFFORT | | |
| INTERNET | NET | a | 1 | EF-PHB | * | |
| | | | | AF-PHB | | |
| | | | | BEST EFFORT | | * |

FIG.10B

| DESTINATION | SERVICE CLASS | MESSAGE-PACKET RETURN PERIOD | FEE INFORMATION | VALUE FOR SPEED AS FIRST PRIORITY | VALUE FOR FEE AS FIRST PRIORITY |
|---|---|---|---|---|---|
| X | EF-PHB | 2 | 20 | 21.3 | 46.0 |
| | AF-PHB | 20 | 10 | 29.1 | 30.9 |
| | BEST EFFORT | 50 | 1 | 49.6 | 23.1 |

FIG.12B

| DESTINATION | HOST/NET | NEXT HOP | OUTPUT PORT | SERVICE CLASS | MOST APPROPRIATE ROUTE SPEED | MOST APPROPRIATE ROUTE FEE |
|---|---|---|---|---|---|---|
| ISP-#1 | NET | a | 1 | — | * | * |
| ISP-#2 | NET | c | 2 | — | * | * |
| X | HOST | a | 1 | EF-PHB<br>AF-PHB<br>BEST EFFORT<br>BEST EFFORT | * | |
| | | c | 2 | | | * |
| INTERNET | NET | a | 1 | EF-PHB<br>AF-PHB<br>BEST EFFORT<br>BEST EFFORT | * | |
| | | c | 2 | | | * |

FIG.12C

| DESTINATION | "VIA" NETWORK | SERVICE CLASS | MESSAGE-PACKET RETURN PERIOD | FEE INFORMATION | VALUE FOR SPEED AS FIRST PRIORITY | VALUE FOR FEE AS FIRST PRIORITY |
|---|---|---|---|---|---|---|
| X | ISP-#1 | EF-PHB | 1 | 20 | 20.2 | 43.3 |
| | | AF-PHB | 4 | 10 | 17.1 | 24.6 |
| | | BEST EFFORT | 20 | 1 | 40.9 | 19.3 |
| | ISP-#2 | (BEST EFFORT) | 10 | 2 | 21.8 | 12.8 |

FIG.13A

| DESTINATION | HOST/NET | NEXT HOP | OUTPUT PORT | SERVICE CLASS | MOST APPROPRIATE ROUTE | |
|---|---|---|---|---|---|---|
| | | | | | SPEED | FEE |
| ISP-#1 | NET | a | 1 | — | * | * |
| ISP-#2 | NET | c | 2 | — | | * |
| X | HOST | a | 1 | EF-PHB | | |
| | | | | AF-PHB | | |
| | | | | BEST EFFORT | | |
| | | c | 2 | BEST EFFORT | * | * |
| INTERNET | NET | a | 1 | EF-PHB | | |
| | | | | AF-PHB | | |
| | | | | BEST EFFORT | | |
| | | c | 2 | BEST EFFORT | * | * |

FIG.13B

| DESTINATION | "VIA" NETWORK | SERVICE CLASS | MESSAGE-PACKET RETURN PERIOD | FEE INFORMATION | VALUE FOR SPEED AS FIRST PRIORITY | VALUE FOR FEE AS FIRST PRIORITY |
|---|---|---|---|---|---|---|
| X | ISP-#1 | EF-PHB | 2 | 20 | 20.3 | 43.3 |
| | | AF-PHB | 10 | 10 | 19.5 | 25.7 |
| | | BEST EFFORT | 40 | 1 | 42.7 | 20.0 |
| | ISP-#2 | (BEST EFFORT) | 15 | 2 | 17.5 | 11.0 |

FIG.17B

| DESTINATION | "VIA" NETWORK | SERVICE CLASS | MESSAGE-PACKET TRANSMISSION TIME | ACK-MESSAGE RECEPTION TIME | DATA TRANSMISSION TIME | FEE INFORMATION |
|---|---|---|---|---|---|---|
| X | ISP-#1 | EF-PHB | 19:03:41:347 | 19:04:01:241 | 00:00:19:894 | 20 |
| | | AF-PHB | 19:03:41:347 | 19:04:09:530 | 00:00:28:183 | 10 |
| | | BEST EFFORT | 19:03:41:347 | 19:04:39:911 | 00:00:58:564 | 1 |
| | ISP-#2 | BEST EFFORT | 19:03:41:347 | 19:04:24:520 | 00:00:43:173 | 2 |

FIG.19B

| VERSION | HEADER LENGTH | TOS | PACKET LENGTH | |
|---|---|---|---|---|
| IDENTIFICATION | | | FLAG | FRAGMENT OFFSET |
| TTL | PROTOCOL TYPE = 01 | | HEADER CHECKSUM | |
| SOURCE IP ADDRESS | | | | |
| DESTINATION IP ADDRESS | | | | |
| OPTION | | | | PADDING |
| ICMP TYPE = 0D/0E | CODE (ALWAYS 0) | | CHECKSUM | |
| IDENTIFIER | | | SEQUENCE NUMBER | |
| (ORIGINATE TIMESTAMP) | | | | |
| (RECEIVE TIMESTAMP) | | | | |
| (TRANSMIT TIMESTAMP) | | | | |

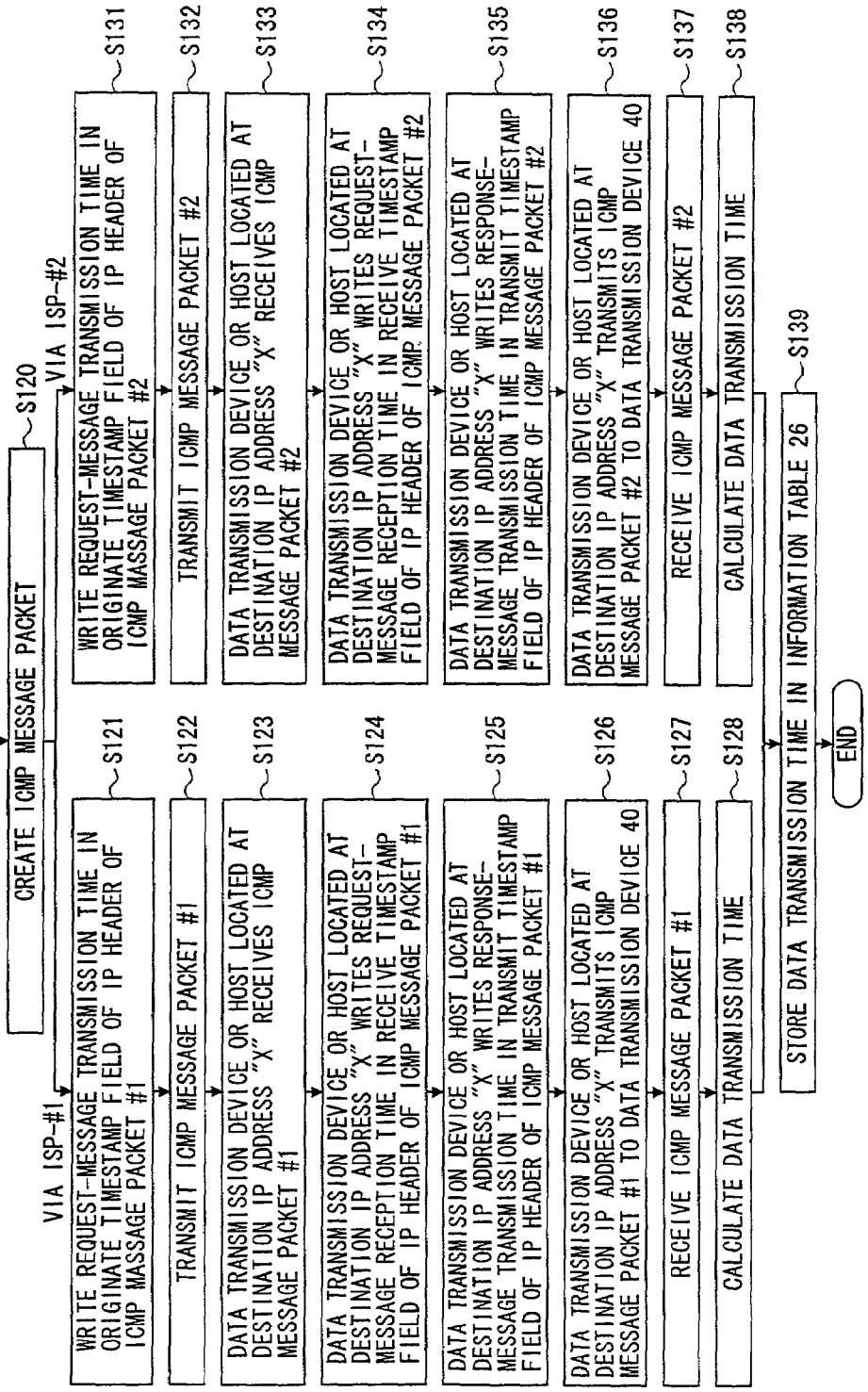

FIG.22A

| DESTINATION | "VIA" NETWORK | MESSAGE-PACKET RETURN PERIOD | FEE INFORMATION |
|---|---|---|---|
| 172.16.2.20 | ISP-#1 | - | 1 |
| | ISP-#2 | - | 1 |

FIG.22B

| DESTINATION IP ADDRESS | HOST/NET | NEXT HOP | OUTPUT PORT | MOST APPROPRIATE ROUTE |
|---|---|---|---|---|
| 172.16.1.10 | HOST | - | 1 | * |
| 172.16.2.3 | | - | 2 | * |
| 172.16.2.4 | | - | 3 | * |
| 172.16.3.0/24 | NET | 172.16.2.3 | 2 | * |
| 172.16.4.0/24 | NET | 172.16.2.4 | 3 | * |
| 172.16.5.0/24 | NET | 172.16.2.3 | 2 | |
| | | 172.16.2.4 | 3 | |
| 172.16.6.0/24 | NET | 172.16.2.3 | 2 | |
| | | 172.16.2.4 | 3 | |

FIG.23A

| VERSION | HEADER LENGTH | TOS | PACKET LENGTH | |
|---|---|---|---|---|
| IDENTIFICATION | | | FLAG | FRAGMENT OFFSET |
| TTL | | PROTOCOL TYPE = 01 | | HEADER CHECKSUM |
| SOURCE IP ADDRESS = 172.16.2.1 | | | | |
| DESTINATION IP ADDRESS = 172.16.6.20 | | | | |
| OPTION TYPE = 10000011 | OPTION LENGTH | | POINTER | |
| 172.16.2.1 (R1) | | | | ADDRESS 1 = |
| 172.16.3.1 (Ra) | | | | ADDRESS 2 = |
| 172.16.6.20 (HOST Y) | | | | ADDRESS 3 = |
| | | | | PADDING |
| ICMP TYPE = 0D | CODE (ALWAYS 0) | | CHECKSUM | |
| IDENTIFIER = DEAD | | | SEQUENCE NUMBER = 0000 | |
| ORIGINATE TIMESTAMP = 19:03:41:347 | | | | |
| (RECEIVE TIMESTAMP) | | | | |
| (TRANSMIT TIMESTAMP) | | | | |

FIG.23B

| VERSION | HEADER LENGTH | TOS | PACKET LENGTH | |
|---|---|---|---|---|
| IDENTIFICATION | | | FLAG | FRAGMENT OFFSET |
| TTL | PROTOCOL TYPE = 01 | | HEADER CHECKSUM | |
| SOURCE IP ADDRESS = 172.16.2.1 | | | | |
| DESTINATION IP ADDRESS = 172.16.6.20 | | | | |
| OPTION TYPE = 10000011 | OPTION LENGTH | POINTER | ADDRESS 1 = | |
| 172.16.2.1 (R1) | | | ADDRESS 2 = | |
| 172.16.4.1 (Rc) | | | ADDRESS 3 = | |
| 172.16.6.20 (HOST Y) | | | PADDING | |
| ICMP TYPE = 0D | CODE (ALWAYS 0) | | CHECKSUM | |
| IDENTIFIER = DEAE | | | SEQUENCE NUMBER = 0000 | |
| ORIGINATE TIMESTAMP = 19:03:41:347 | | | | |
| (RECEIVE TIMESTAMP) | | | | |
| (TRANSMIT TIMESTAMP) | | | | |

FIG.24A

| DESTINATION | HOST/NET | NEXT HOP | OUTPUT PORT | MOST APPROPRIATE ROUTE |
|---|---|---|---|---|
| 172.16.1.0/24 | NET | 172.16.2.1 | 1 | * |
| 172.16.2.0/24 | NET | – | 1 | * |
| 172.16.3.0/24 | NET | – | 2 | * |
| 172.16.4.0/24 | NET | 172.16.2.1 | 2 | * |
| 172.16.5.0/24 | NET | 172.16.3.2 | 2 | * |
| 172.16.6.0/24 | NET | 172.16.3.2 | 2 | * |

FIG.24B

| DESTINATION | HOST/NET | NEXT HOP | OUTPUT PORT | MOST APPROPRIATE ROUTE |
|---|---|---|---|---|
| 172.16.1.0/24 | NET | 172.16.3.1 | 1 | * |
| 172.16.2.0/24 | NET | 172.16.3.1 | 1 | * |
| 172.16.3.0/24 | NET | – | 1 | * |
| 172.16.4.0/24 | NET | 172.16.5.1 | 2 | * |
| 172.16.5.0/24 | NET | – | 2 | * |
| 172.16.6.0/24 | NET | 172.16.5.1 | 2 | * |

FIG.24C

| DESTINATION | HOST/NET | NEXT HOP | OUTPUT PORT | MOST APPROPRIATE ROUTE |
|---|---|---|---|---|
| 172.16.1.0/24 | NET | 172.16.5.3 | 1 | * |
|  |  | 172.16.5.4 | 2 |  |
| 172.16.2.0/24 | NET | 172.16.5.3 | 1 | * |
|  |  | 172.16.5.4 | 2 |  |
| 172.16.3.0/24 | NET | 172.16.5.3 | 1 | * |
| 172.16.4.0/24 | NET | 172.16.5.4 | 2 | * |
| 172.16.5.0/24 | NET | – | 1 | * |
| 172.16.6.20 | HOST | – | 3 | * |

FIG.25A

| VERSION | HEADER LENGTH | TOS | PACKET LENGTH | |
|---|---|---|---|---|
| IDENTIFICATION | | | FLAG | FRAGMENT OFFSET |
| TTL | | PROTOCOL TYPE = 01 | HEADER CHECKSUM | |
| SOURCE IP ADDRESS = 172.16.6.20 | | | | |
| DESTINATION IP ADDRESS = 172.16.2.1 | | | | |
| ICMP TYPE = 0E | | CODE (ALWAYS 0) | CHECKSUM | |
| IDENTIFIER = DEAD | | | SEQUENCE NUMBER = 0000 | |
| ORIGINATE TIMESTAMP = 19:03:41:347 | | | | |
| RECEIVE TIMESTAMP = 19:04:01:241 | | | | |
| TRANSMIT TIMESTAMP = 19:04:01:583 | | | | |

FIG.25B

| DESTINATION | "VIA" NETWORK | MESSAGE-PACKET RETURN PERIOD | FEE INFORMATION |
|---|---|---|---|
| Y | ISP-#1 | 00:00:19:894 | 1 |
| | ISP-#2 | 00:00:28:183 | 1 |

FIG.25C

| DESTINATION | HOST/NET | NEXT HOP | OUTPUT PORT | MOST APPROPRIATE ROUTE |
|---|---|---|---|---|
| 172.16.1.10 | HOST | – | 1 | * |
| 172.16.2.3 | | – | 2 | * |
| 172.16.2.4 | | – | 3 | * |
| 172.16.3.0/24 | NET | 172.16.2.3 | 2 | * |
| 172.16.4.0/24 | NET | 172.16.2.4 | 3 | * |
| 172.16.5.0/24 | NET | 172.16.2.3 | 2 | * |
| | | 172.16.2.4 | 3 | |
| 172.16.6.0/24 | NET | 172.16.2.3 | 2 | * |
| | | 172.16.2.4 | 3 | |

FIG.27A

| DESTINATION | SERVICE CLASS | MESSAGE-PACKET RETURN PERIOD | FEE INFORMATION | VALUE FOR SPEED AS FIRST PRIORITY | VALUE FOR FEE AS FIRST PRIORITY |
|---|---|---|---|---|---|
| 172.16.6.20 | EF-PHB | — | 10 | | |
| | AF-PHB | — | 5 | | |
| | BEST EFFORT | — | 1 | | |

FIG.27B

| DESTINATION | HOST/NET | NEXT HOP | OUTPUT PORT | SERVICE CLASS | MOST APPROPRIATE ROUTE |
|---|---|---|---|---|---|
| 172.16.1.10 | HOST | — | 1 | — | |
| 172.16.2.0/24 | NET | — | 2 | — | * |
| 172.16.3.0/24 | NET | 172.16.2.2 | 2 | EF-PHB<br>AF-PHB<br>BEST EFFORT | * |
| 172.16.5.0/24 | NET | 172.16.2.2 | 2 | EF-PHB<br>AF-PHB<br>BEST EFFORT | |
| 172.16.6.0/24 | NET | 172.16.2.2 | 2 | EF-PHB<br>AF-PHB<br>BEST EFFORT | |

FIG.28A

| VERSION | HEADER LENGTH | EF-PHB | PACKET LENGTH | |
|---|---|---|---|---|
| IDENTIFICATION | | | FLAG | FRAGMENT OFFSET |
| TTL | | PROTOCOL TYPE = 01 | HEADER CHECKSUM | |
| SOURCE IP ADDRESS = 172.16.2.1 | | | | |
| DESTINATION IP ADDRESS = 172.16.6.20 | | | | |
| ICMP TYPE = 0D | | CODE (ALWAYS 0) | CHECKSUM | |
| IDENTIFIER = DEAD | | | SEQUENCE NUMBER = 0000 | |
| ORIGINATE TIMESTAMP = 19:03:41:347 | | | | |
| (RECEIVE TIMESTAMP) | | | | |
| (TRANSMIT TIMESTAMP) | | | | |

FIG.28B

| VERSION | HEADER LENGTH | AF-PHB | PACKET LENGTH | |
|---|---|---|---|---|
| IDENTIFICATION | | | FLAG | FRAGMENT OFFSET |
| TTL | | PROTOCOL TYPE = 01 | HEADER CHECKSUM | |
| SOURCE IP ADDRESS = 172.16.2.1 | | | | |
| DESTINATION IP ADDRESS = 172.16.6.20 | | | | |
| ICMP TYPE = 0D | | CODE (ALWAYS 0) | CHECKSUM | |
| IDENTIFIER = DEAE | | | SEQUENCE NUMBER = 0000 | |
| ORIGINATE TIMESTAMP = 19:03:41:347 | | | | |
| (RECEIVE TIMESTAMP) | | | | |
| (TRANSMIT TIMESTAMP) | | | | |

FIG.28C

| VERSION | HEADER LENGTH | BEST EFFORT | PACKET LENGTH | |
|---|---|---|---|---|
| IDENTIFICATION | | | FLAG | FRAGMENT OFFSET |
| TTL | | PROTOCOL TYPE = 01 | HEADER CHECKSUM | |
| SOURCE IP ADDRESS = 172.16.2.1 | | | | |
| DESTINATION IP ADDRESS = 172.16.6.20 | | | | |
| ICMP TYPE = 0D | | CODE (ALWAYS 0) | CHECKSUM | |
| IDENTIFIER = DEAF | | | SEQUENCE NUMBER = 0000 | |
| ORIGINATE TIMESTAMP = 19:03:41:347 | | | | |
| (RECEIVE TIMESTAMP) | | | | |
| (TRANSMIT TIMESTAMP) | | | | |

FIG.29A

| DESTINATION | HOST/NET | NEXT HOP | OUTPUT PORT | SERVICE CLASS | MOST APPROPRIATE ROUTE |
|---|---|---|---|---|---|
| 172.16.1.0/24 | NET | 172.16.2.1 | 1 | — | * |
| 172.16.2.0/24 | NET | — | 1 | — | * |
| 172.16.3.0/24 | NET | — | 2 | EF-PHB<br>AF-PHB<br>BEST EFFORT | |
| 172.16.5.0/24 | NET | 172.16.3.2 | 2 | EF-PHB<br>AF-PHB<br>BEST EFFORT | |
| 172.16.6.0/24 | NET | 172.16.3.2 | 2 | EF-PHB<br>AF-PHB<br>BEST EFFORT | |

FIG.29B

| DESTINATION | HOST/NET | NEXT HOP | OUTPUT PORT | SERVICE CLASS | MOST APPROPRIATE ROUTE |
|---|---|---|---|---|---|
| 172.16.1.0/24 | NET | 172.16.3.1 | 1 | EF-PHB<br>AF-PHB<br>BEST EFFORT | |
| 172.16.2.0/24 | NET | 172.16.3.1 | 1 | EF-PHB<br>AF-PHB<br>BEST EFFORT | |
| 172.16.3.0/24 | NET | | 1 | EF-PHB<br>AF-PHB<br>BEST EFFORT | |
| 172.16.5.0/24 | NET | | 2 | — | * |
| 172.16.6.0/24 | NET | 172.16.5.1 | 2 | — | * |

FIG.29C

| DESTINATION | HOST/NET | NEXT HOP | OUTPUT PORT | SERVICE CLASS | MOST APPROPRIATE ROUTE |
|---|---|---|---|---|---|
| 172.16.1.0/24 | NET | 172.16.5.2 | 1 | EF-PHB<br>AF-PHB<br>BEST EFFORT | |
| 172.16.2.0/24 | NET | 172.16.5.2 | 1 | EF-PHB<br>AF-PHB<br>BEST EFFORT | |
| 172.16.3.0/24 | NET | 172.16.5.2 | 1 | EF-PHB<br>AF-PHB<br>BEST EFFORT | |
| 172.16.5.0/24 | NET | — | 1 | | * |
| 172.16.6.20 | HOST | — | 2 | | * |

FIG.30A

| VERSION | HEADER LENGTH | TOS | PACKET LENGTH | |
|---|---|---|---|---|
| IDENTIFICATION | | | FLAG | FRAGMENT OFFSET |
| TTL | PROTOCOL TYPE = 01 | | HEADER CHECKSUM | |
| SOURCE IP ADDRESS = 172.16.20 | | | | |
| DESTINATION IP ADDRESS = 172.16.2.1 | | | | |
| ICMP TYPE = 0E | CODE (ALWAYS 0) | | CHECKSUM | |
| IDENTIFIER = DEAD | | | SEQUENCE NUMBER = 0000 | |
| ORIGINATE TIMESTAMP = 19:03:41:347 | | | | |
| RECEIVE TIMESTAMP = 19:04:01:241 | | | | |
| TRANSMIT TIMESTAMP = 19:04:01:583 | | | | |

FIG.30B

| DESTINATION | SERVICE CLASS | MESSAGE-PACKET RETURN PERIOD | FEE INFORMATION | VALUE FOR SPEED AS FIRST PRIORITY | VALUE FOR FEE AS FIRST PRIORITY |
|---|---|---|---|---|---|
| 172.16.6.20 | EF-PHB | 00:00:19:894 | 20 | 32.4 | 50.8 |
|  | AF-PHB | 00:00:28:183 | 10 | 28.2 | 30.5 |
|  | BEST EFFORT | 00:00:58:564 | 1 | 39.4 | 18.7 |

FIG.30C

| DESTINATION | HOST/NET | NEXT HOP | OUTPUT PORT | SERVICE CLASS | MOST APPROPRIATE ROUTE | |
|---|---|---|---|---|---|---|
| | | | | | SPEED | FEE |
| 172.16.1.10 | HOST | — | 1 | — | | |
| 172.16.2.0/24 | NET | — | 2 | — | * | * |
| 172.16.3.0/24 | NET | 172.16.2.2 | 2 | EF-PHB<br>AF-PHB<br>BEST EFFORT | * | * |
| 172.16.5.0/24 | NET | 172.16.2.2 | 2 | EF-PHB<br>AF-PHB<br>BEST EFFORT1 | * | |
| 172.16.6.0/24 | NET | 172.16.2.2 | 2 | EF-PHB<br>AF-PHB<br>BEST EFFORT1 | | * |

DATA TRANSMISSION APPARATUS SELECTING EFFICIENT NETWORK OR SERVICE CLASS

BACKGROUND OF THE INVENTION

1. Field of the Invention

The present invention relates to a method and an apparatus for transmitting data. More particularly, the present invention relates to a method and an apparatus for transmitting data by taking the steps of selecting a network and a service class, and executing an IP (Internet Protocol) communication.

2. Description of the Related Art

With the recent and rapid spread of the Internet, the number of ISPs (Internet Service Providers) providing Internet connection services has been increasing. In such a circumstance, it is predictable that a user contracts with a plurality of ISPs. Additionally, with the increase in the number of ISPs, some ISPs might support differentiated services on an IP network so as to distinguish their services from other ISPs, the differentiated services currently moving forward to be standardized by the IETF (Internet Engineering Task Force). Furthermore, an increase in the number of such ISPs supporting the differentiated services is well anticipated in the future. In addition, a fee system for use of a network might change in accordance with communication traffic information about the network in the future.

A differentiated service for each data is achieved by writing of IP data transmitted equally by a best effort service to a part of an IP header such as a TOS field of an IPv4 (Internet Protocol version 4) or by writing a code DSCP (Differentiated Service Code Point) indicating an order of priority to a traffic class octet of an IPv6 (Internet Protocol version 6). The prospect of supporting such a differentiated service gives rise to expectations for achievement of the differentiated service at least on a single domain of an IP network, and to data exchange through the single domain in the future. Generally, in the differentiated service, a service class called a PHB (Per Hop Behavior) is defined. Additionally, an EF-PHB (Expedited Forwarding PHB) and an AF-PHB (Assured Forwarding PHB) are currently suggested, and are in movement toward standardization. The EF-PHB has the highest priority. The AF-PHB having lower priority than the EF-PHB further includes four priority classes that are an AF1, an AF2, an AF3 and an AF4 in a decreasing priority order. The AF-PHB has higher priority than the best effort service, but may be discarded when the IP network is overcrowded.

In a case of contracting with a plurality of ISPs, a user takes a selection of a network and a service class for transmitting data most efficiently as a significant matter of concern. Static information such as contents of service classes of a differentiated service can be considered in advance. However, dynamic information indicating a current network condition such as communication traffic information about the network included in the network is not disclosed, and thus a network or a service class cannot be selected. Even if such dynamic information included in the network is disclosed, since a data transmission device does not include a method of selecting the network or the service class, a user needs to select the network and the service class by determining whether the network or the service class is capable of executing the most efficient data transmission. Additionally, the user needs to set a change in the service class manually. Accordingly, there has been a demand for a data transmission device automatically executing a selection of a network and a service class by which the data transmission device can transmit data most efficiently.

FIG. 1 is a block diagram showing a configuration of a conventional data transmission device. A data transmission device 10 shown in FIG. 1 includes a buffer 11, a routing table 12, a path selection unit 13, an output port selector 14, and output ports 15. The buffer 11 stores data inputted to the data transmission device 10. The routing table 12 stores address information about a network layer corresponding to input data and correspondence of the input data and a destination data transmission device or a destination host. The path selection unit 13 determines the most appropriate path for transmitting the input data. FIG. 2 is a diagram showing a data transmission system including the data transmission device 10. Additionally, FIG. 3 is a flowchart showing processes performed by the data transmission device 10 to transmit the input data to its destination.

A basic function of the data transmission device 10 is to search the routing table 12 based on a destination IP address of data, and to transmit the data to a following data transmission device or host on a way to a destination of the data. To be concrete, in a case of receiving data transmitted from a user at a step S1 shown in FIG. 3, the data transmission device 10 performs the following processes. At a step S2, the data transmission device 10 stores the data in the buffer 11. Subsequently, at a step S3, the data transmission device 10 searches through the routing table 12 for a data transmission device or a host located at a next hop (level) based on a network address part of a destination IP address of the data. The data transmission device 10 determines the next hop at a step S4, and selects an output port that connects the data transmission device 10 to the data transmission device or the host located at the next hop, at a step S5. At a step S6, the data transmission device 10 transmits the data stored in the buffer 11 from a selected output port.

There are two methods of creating the routing table 12, which methods are static and dynamic methods. The static method of creating the routing table 12 is a method in which a network manager or the like sets fixed values in the routing table 12. The static method has advantages of decreasing a load of the data transmission device 10, and of easy security management and failure detection. However, such a method has a disadvantage of increasing a burden for the network manager since the fixed values for the data transmission device 10 related to a change in a configuration of a network needs to be changed every time the configuration of the network is changed. On the other hand, the dynamic method of creating the routing table 12 is achieved by an exchange of information about network conditions stored in each data transmission device with other data transmission devices by use of a routing protocol. Each data transmission device initiatively calculates the most appropriate data transmission path corresponding to the network conditions based on the information received from other data transmission devices, and dynamically creates the routing table 12. According to the dynamic method, even if a part of the network has failed, a remaining normal part of the network rebuilds the network automatically or finds out a new data transmission path by operating initiatively, and continues communication.

A conventional data transmission device such as the data transmission device 10 does not include a method of obtaining dynamic information changing every moment such as communication traffic information about an ISP network, storing the dynamic information, and determining the most appropriate data transmission path based on the dynamic information. Therefore, a user individually needs to select a network by determining the most appropriate data transmission path. However, in a case in which an ISP does not disclose the dynamic information about its own ISP network, a user might determine a network connection based only on contents of a service class provided by the ISP network. Thus, the user has a problem when selecting the most appropriate data transmission path certainly. For instance, the user might face the following case. The user selects a path using an AF-PHB of an ISP-A corresponding to a differentiated service as a charged service for transmitting data from the data transmission device 10 shown in FIG. 2. However, the path selected by the user turns out to be very crowded. On the other hand, a path not corresponding to the differentiated service such as a best effort transmission path of an ISP-B is less crowded and faster for transmitting the data from the data transmission device 10.

Even in a case in which the ISP discloses the dynamic information about its own ISP network, a conventional data transmission device does not include methods of obtaining and storing the dynamic information. Accordingly, the user has to select a network from a plurality of networks and to set the network personally. Additionally, even in a case in which a plurality of service classes are provided in the network, the conventional data transmission device does not include methods of obtaining and storing static and dynamic information about the service classes. Thus, the user has to select a service class from the plurality of service classes and to set the service class manually.

As describe above, a manual selection of the most appropriate path and service class by a user in accordance with network conditions burdens the user. Additionally, the manual selection has a problem of possibly not selecting the most appropriate path and service class.

SUMMARY OF THE INVENTION

Accordingly, it is a general object of the present invention to provide a method and an apparatus for selecting a network or a service class, and for transmitting data by use of the network or the service class. A more particular object of the present invention is to provide a method and an apparatus for transmitting data by use of an appropriate network or service class, and for updating the appropriate network or service class in accordance with a change in network conditions.

The above-described object of the present invention is achieved by a data transmission apparatus transmitting data received from a user terminal device through a plurality of networks to a destination, the user terminal device executing communication using an Internet protocol, the data transmission apparatus including a routing table storing information relating a destination address of the data and addresses of the plurality of networks; an information table storing static and dynamic information about the plurality of networks; and a selection unit selecting one or the plurality of networks, through which the data transmission apparatus transmits the data to the destination, based on the static and dynamic information.

As described above, the present invention provides a method and an apparatus for selecting the appropriate network based on the static and dynamic information about the plurality of networks, thereby enabling data transmission through the appropriate network.

Other objects, features and advantages of the present invention will become more apparent from the following detailed description when read in conjunction with the accompanying drawings.

BRIEF DESCRIPTION OF THE DRAWINGS

FIG. 3 is a flowchart showing processes performed by the conventional data transmission device to transmit input data to its destination;

FIG. 4 is a block diagram showing a configuration of a data transmission device according to a first embodiment of the present invention;

FIGS. 8A, 8B and 8C are diagrams respectively showing a data transmission system including the data transmission device, a routing table and an information table, according to the second embodiment;

FIG. 9 is a flowchart showing processes performed by a data transmission device according to a third embodiment of the present invention;

FIGS. 10A and 10B are diagrams respectively showing a routing table and an information table according to the third embodiment;

FIGS. 12A, 12B and 12C are diagrams respectively showing a data transmission system including the data transmission device, a routing table and an information table, according to the fourth embodiment;

FIGS. 13A and 13B are diagrams respectively showing a routing table and an information table according to a fifth embodiment of the present invention;

FIGS. 17A and 17B are diagrams respectively showing a data transmission system including a data transmission device, and an information table, according to a ninth embodiment of the present invention;

FIGS. 19A and 19B are diagrams respectively showing a data transmission system including a data transmission device, and an IP header of a message packet, according to a tenth embodiment of the present invention;

FIG. 20 is a flowchart showing processes performed by the data transmission device according to the tenth embodiment;

FIGS. 22A and 22B are diagrams respectively showing an information table and a routing table according to the eleventh embodiment;

FIGS. 23A and 23B are diagrams respectively showing an ICMP message packet transmitted through an ISP-#1 and an ICMP message packet transmitted through an ISP-#2, according to the eleventh embodiment;

FIGS. 24A, 24B and 24C are diagrams respectively showing a routing table of a router Ra, a routing table of a router Rb, and a routing table of a router R2, according to the eleventh embodiment;

FIGS. 25A, 25B and 25C are diagrams respectively showing an ICMP message packet transmitted from a host Y, an updated information table and an updated routing table, according to the eleventh embodiment;

FIGS. 27A and 27B are diagrams respectively showing an information table and a routing table of a router R1, according to the twelfth embodiment;

FIGS. 28A, 28B and 28C are diagrams showing ICMP message packets created by the router R1 according to the twelfth embodiment;

FIGS. 29A, 29B and 29C are diagrams respectively showing a routing table of the router Ra, a routing table of the router Rb, and a routing table of the router R2, according to the twelfth embodiment; and FIGS. 30A, 30B and 30C are diagrams respectively showing an ICMP message packet transmitted from the host Y, an updated information table and an updated routing table, according to the twelfth embodiment.

DESCRIPTION OF THE PREFERRED EMBODIMENTS

A description will now be given of preferred embodiments of the present invention, with reference to the accompanying drawings.

Figure 1:
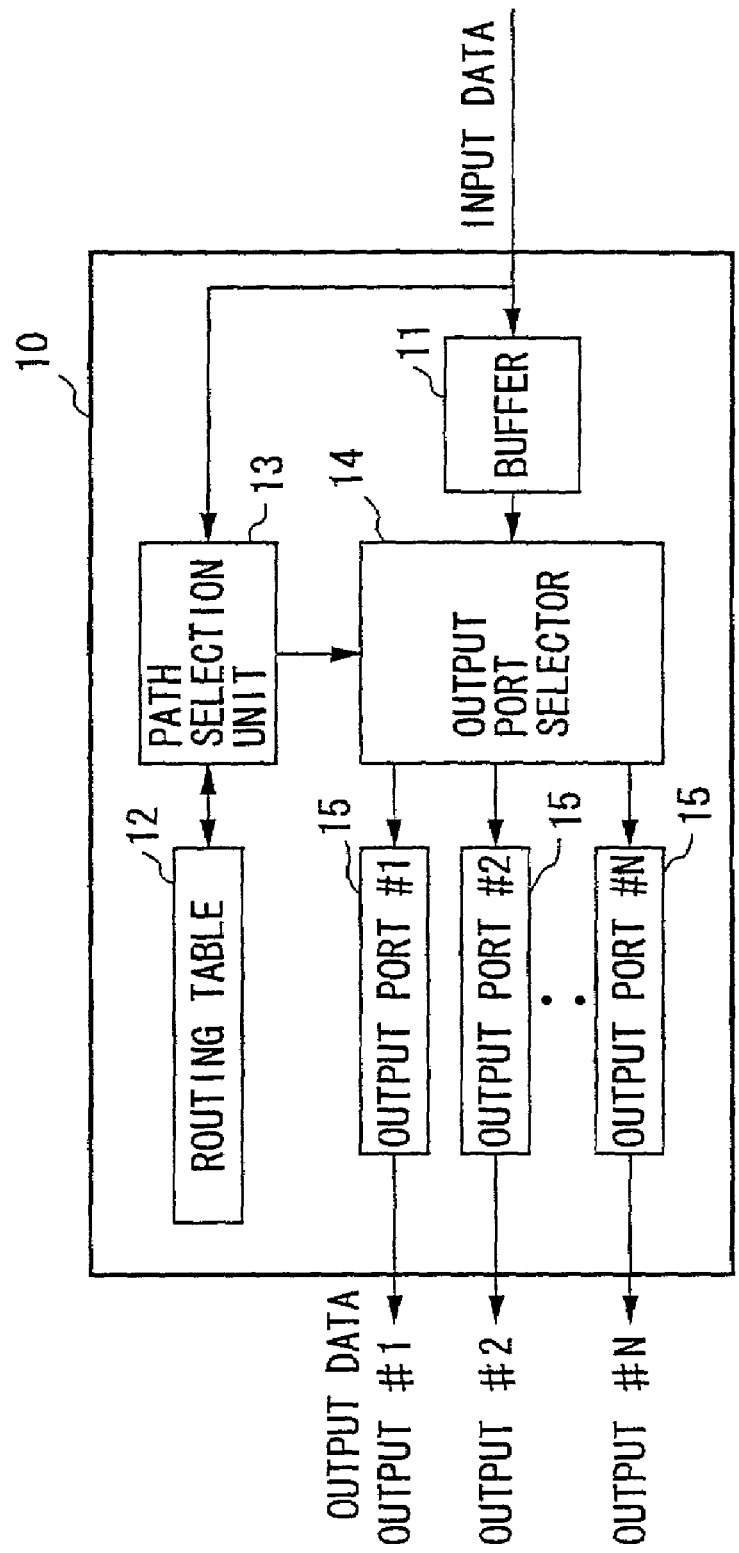
FIG. 1 is a block diagram showing a configuration of a conventional data transmission device.
Figure 2:
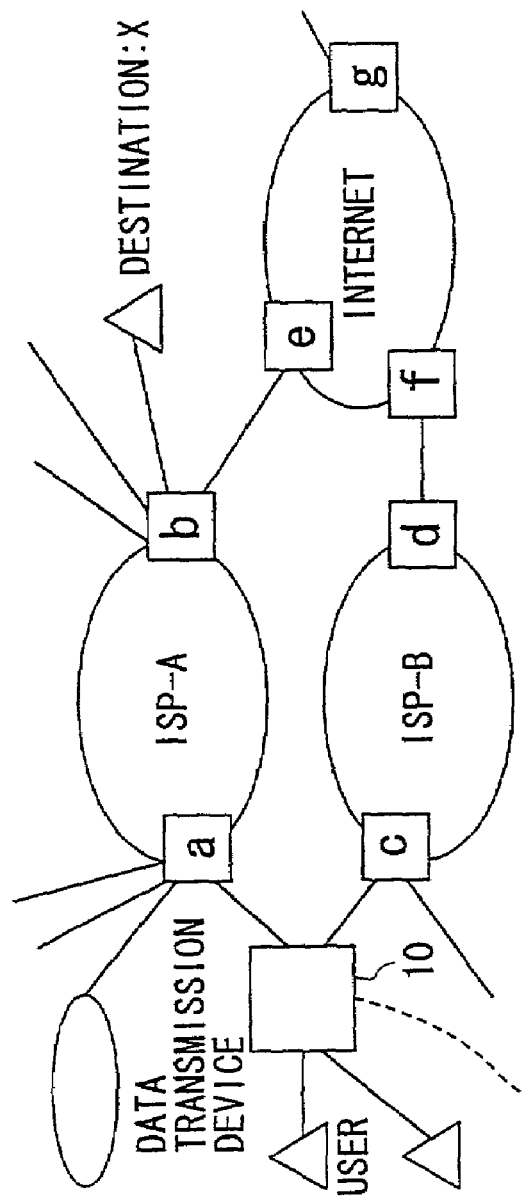
FIG. 2 is a diagram showing a data transmission system including the conventional data transmission device.
Figures 5A, 5B, 5C:
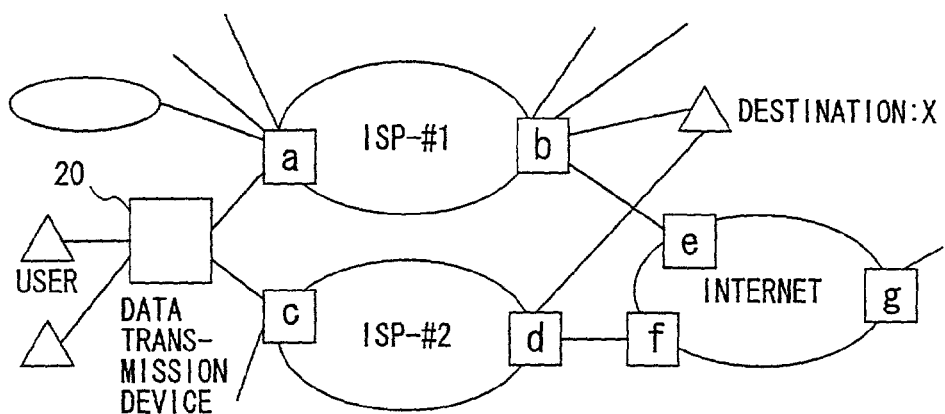
FIGS. 5A, 5B and 5C are diagrams respectively showing a data transmission system including the data transmission device, a routing table and an information table, according to the first embodiment.
Figure 6:
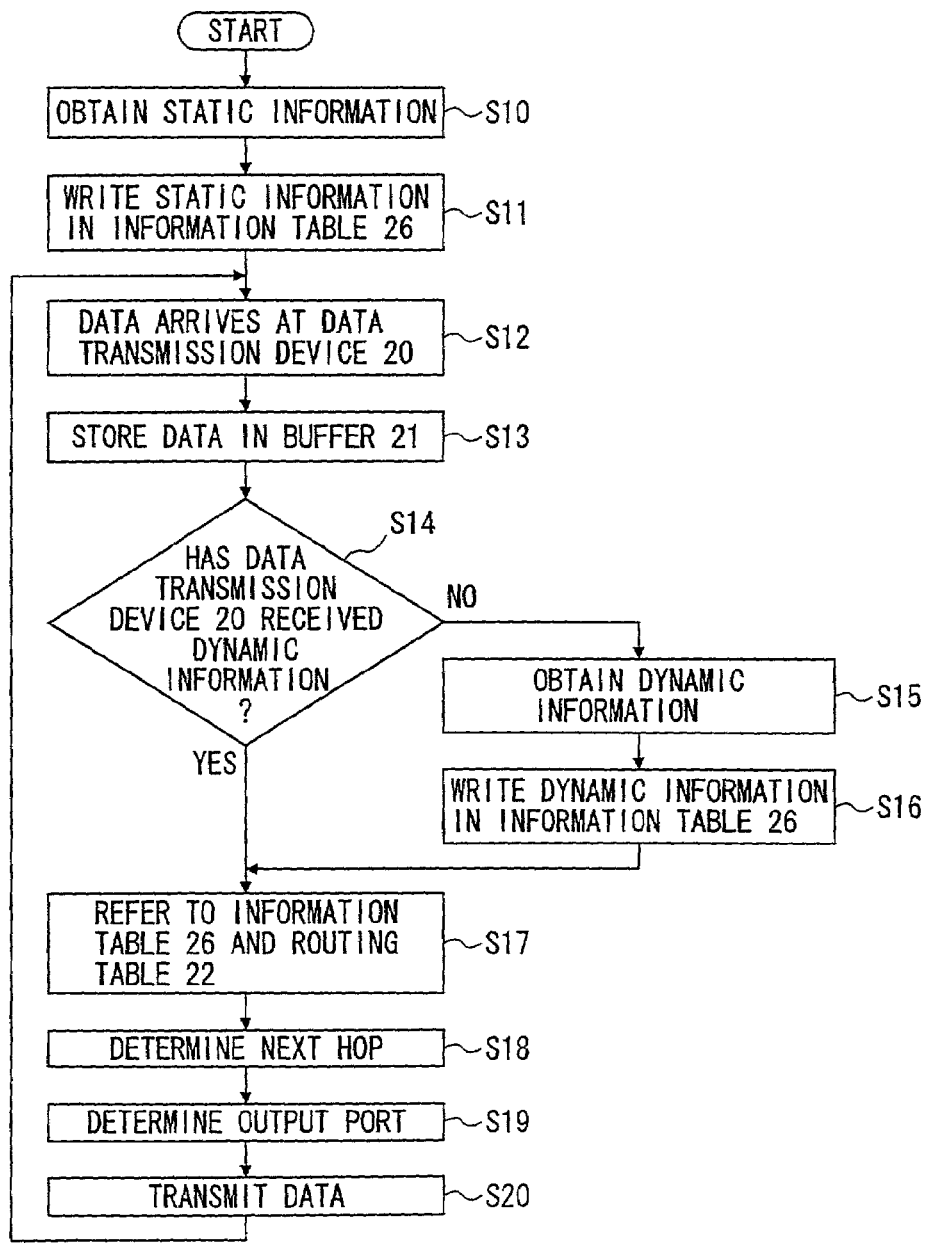
FIG. 6 is a flowchart showing processes performed by the data transmission device according to the first embodiment for transmitting the input data toward its destination.

FIG. 4 is a block diagram showing a configuration of a data transmission device according to a first embodiment of the present invention. A data transmission device 20 shown in FIG. 4 includes a buffer 21, a routing table 22, a path selection unit 23, an output port selector 24, output ports 25, an information table 26 and a table management unit 27. The buffer 21 stores input data. The routing table 22 stores address information about a network layer corresponding to the input data and correspondence of the input data and a destination data transmission device or a destination host. The information table 26 stores static and dynamic information about a network to which the data transmission device 20 is connected. The path selection unit 13 determines the most appropriate path for transmitting the input data by referring to the routing table 22 and the information table 26. Additionally, the table management unit 27 manages the routing table 22 and the information table 26. FIGS. 5A, 5B and 5C are diagrams respectively showing a data transmission system including the data transmission device 20, the routing table 22 and the information table 26. Furthermore, FIG. 6 is a flowchart showing processes performed by the data transmission device 20 for transmitting the input data toward its destination.

The data transmission device 20 is connected to an ISP-#1 and an ISP-#2 as shown in FIG. 5A through the output ports 25. FIG. 5A shows a case in which two ISPs are connected to the data transmission device 20. However, the number of ISPs connected to the data transmission device 20 is not limited to two. The routing table 22 shown in FIG. 5B registers a destination of input data, information whether the destination is a host or a network (host/net), a next hop, an output port and the most appropriate route. In FIG. 5B, the most appropriate path for data transmission is indicated as a sign "*". On the other hand, the information table 26 shown in FIG. 5C registers a destination of input data, information about networks, through which the input data is transmitted ("via" network), a message-packet return period and fee information. It should be noted that the data transmission device 20 stores static information such as the fee information about all the networks to which the data transmission device 20 is connected, in the information table 26.

The data transmission device 20 obtains static information such as a network configuration at a step S10 before receiving data transmitted by a user from a terminal device, and stores the static information in the information table 26 at a step S11. After receiving the data transmitted by the user from the terminal device at a step S12, the data transmission device 20 stores the data as input data in the buffer 21 at a step S13. The destination of the input data is assumed to be X. The table management unit 27 periodically receives dynamic information such as communication traffic information about a network, and stores the dynamic information in the information table 26 in a case in which an ISP discloses the dynamic information. At a step S14, if having received the newest dynamic information, the data transmission device 20 proceeds to a step S17. If not, the table management unit 27 receives the newest dynamic information at a step S15, stores the newest dynamic information in the information table 26 at a step S16, and then proceeds to the step S17. A description will be given later of a case in which the data transmission device 20 cannot obtain the dynamic information because the dynamic information is not disclosed.

The path selection unit 23 refers to the routing table 22 and the information table 26 by use of a destination IP address of the input data at a step S17. Subsequently, the path selection unit 23 determines the most appropriate path (the next hop) from data written in the routing table 22 and the information table 26 at a step S18. The fee information for an ISP-#1 and for an ISP-#2 stored in the information table 26 shown in FIG. 5C are the same, and thus the path selection unit 23 determines the ISP-#1 whose data transmission time is shorter than that of the ISP-#2 as the most appropriate path. After selecting the most appropriate path, the data transmission device 20 selects an output port connected to a data transmission device or a host located at the next hop, at a step S19. To be concrete, the data transmission device 20 selects an output port #1 from the information table 26 shown in FIG. 5C. Subsequently, the data transmission device 20 outputs the input data stored in the buffer 21 from the output port #1 to the data transmission device or the host located at the next hop, at a step S20. It should be noted that the path selection unit 23 might be composed of a CPU or exclusive hardware.

As described above, the data transmission device 20 can select a path most appropriate for a user by including the information table 26, storing the static and dynamic information about the network in the information table 26, and determining the path by referring to the static and dynamic information before transmitting the input data. In other words, the present invention provides a method of selecting an appropriate network based on static and dynamic information about a plurality of networks, thereby enabling data transmission through the appropriate network.

Figure 7:
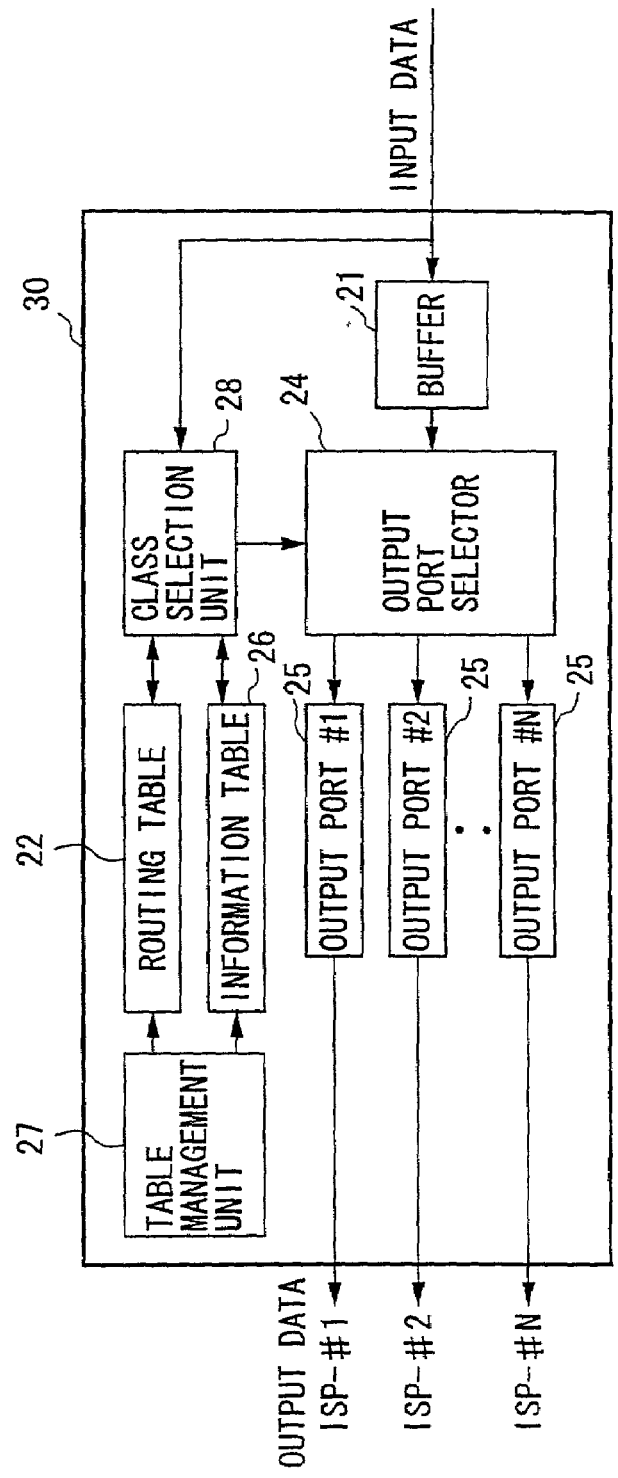
FIG. 7 is a block diagram showing a configuration of a data transmission device according to a second embodiment of the present invention.
Figure 8A:
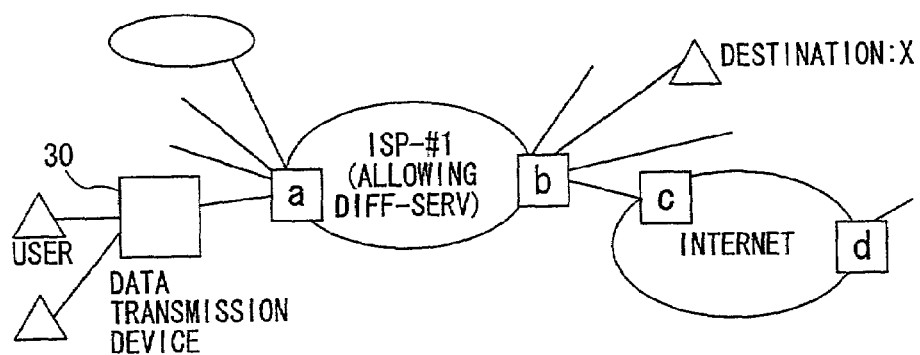

FIG. 7 is a block diagram showing a configuration of a data transmission device according to a second embodiment of the present invention. A data transmission device 30 shown in FIG. 7 includes the buffer 21, the routing table 22, the output port selector 24, the output ports 25, the information table 26 and the table management unit 27. A unit shown in FIG. 7 having the same unit number as a unit shown in FIG. 4 is equivalent to the unit shown in FIG. 4. Additionally, the data transmission device 30 includes a class selection unit 28. The class selection unit 28 determines the most appropriate class in a differentiated service by referring to the routing table 22 and the information table 26. FIGS. 8A, 8B and 8C are diagrams respectively showing a data transmission system including the data transmission device 30, the routing table 22 and the information table 26.

The data transmission device 30 is connected to the ISP-#1 allowing the differentiated service (diff-serv), as shown in FIG. 8A. The differentiated service is brought up as an example of a service having a plurality of service classes therein. However, the service having the plurality of service classes is not limited to the differentiated service. The data transmission device 30 stores the static information about all the networks to which the data transmission device 30 is connected such as fee information and contents of service classes, in the information table 26. Additionally, if an ISP discloses the dynamic information such as communication traffic information about a network, the data transmission device 30 also receives the dynamic information, and stores the dynamic information in the information table 26. The routing table 22 shown in FIG. 8B registers a destination of input data, information whether the destination is a host or a network (host/net), a next hop, an output port, a service class, the most appropriate route based on a data transmission speed (the most appropriate route for a speed), and the most appropriate route based on a data transmission fee (the most appropriate route for a fee). It should be noted that the most appropriate route is indicated as the sign "*" in the routing table 22. On the other hand, the information table 26 shown in FIG. 8C registers a destination of the input data, a service class, a message-packet return period, fee information, a numerical value calculated for the data transmission speed as the first priority (a value for the speed as the first priority), and a numerical value calculated for the data transmission fee as the first priority (a value for the fee as the first priority).

After receiving data whose destination IP address is X from a user terminal device, the data transmission device 30 performs the following processes. The data transmission device 30 initially stores the data as input data in the buffer 21. The class selection unit 28 refers to the routing table 22 and the information table 26 based on information such as a port number written in the destination IP address of the input data or an IP header of the input data. By recognizing the port number, the class selection unit 28 can set a service class for each application recognized from the port number. For example, a user can set the class selection unit 28 to select a service class that attaches greater importance to the data transmission fee than to the data transmission speed if an application is a FTP (File Transfer Protocol), or a service class that attaches the greatest importance to the data transmission speed if the application is to transmit dynamic image data. If the table management unit 27 cannot obtain dynamic information such as communication traffic information about each service class because the dynamic information is not disclosed, the table management unit 27 obtains information by a later-described method, and writes the information in the information table 26. Subsequently, the class selection unit 28 selects the most appropriate service class based on data stored in the routing table 22 and the information table 26. The data transmission device 30 rewrites the IP header of the input data if necessary, and outputs the input data stored in the buffer 21 from one of the output ports 25 selected based on contents of the routing table 22.

It should be noted that the class selection unit 28 might be composed of a CPU or exclusive hardware. Additionally, the class selection unit 28 selects the most appropriate service class based on the numerical value calculated for the data transmission speed as the first priority and the numerical value calculated for the data transmission fee as the first priority, which are stored in the information table 26. The numerical values are calculated, for example, from the following equation in which a user can set suitable numbers for $\alpha$ and $\beta$.

a numerical value=(a data transmission time)$\times\alpha$+(a data transmission fee)$\times\beta$ $\alpha+\beta=1$ In a case of using the differentiated service for transmitting the input data to a data transmission device or a host at the next hop, the data transmission device 30 needs to write a numerical value of a selected service class to a DSCP field of the IP header of the input data.

As described above, the data transmission device 30 can select a service class most appropriate for a user by including the information table 26, storing the static and dynamic information about each service class of the network in the information table 26, and determining the most appropriate service class by referring to the static and dynamic information before transmitting the input data. In other words, the present invention provides a method of selecting an appropriate service class based on static and dynamic information about a plurality of service classes, thereby enabling data transmission by use of the appropriate service class.

FIG. 9 is a flowchart showing processes performed by a data transmission device according to a third embodiment of the present invention. FIGS. 10A and 10B are diagrams respectively showing a routing table and an information table according to the third embodiment. A configuration of the data transmission device according to the third embodiment is the same as that of the data transmission device 30 according to the second embodiment, and thus unit numbers of the data transmission device according to the third embodiment are equal to those of the data transmission device 30 according to the second embodiment. Additionally, the data transmission device 30 according to the third embodiment executes selection of the most appropriate service class, settings and data transmission similarly as the second embodiment.

Additionally, in the third embodiment, the data transmission device 30 performs the processes shown in FIG. 9 periodically even while transmitting input data. At a step S30 shown in FIG. 9, the table management unit 27 comprehends network conditions by obtaining dynamic information about a network. The class selection unit 28 determines the most appropriate service class by referring to the information table 26 at a step S31. If a service class determined as the most appropriate service class is different from current settings (a currently selected service class) as a result of a change in the network conditions, the class selection unit 28 changes the service class most appropriate for transmitting the input data in the routing table 22 at a step S34. The above-described processes are executed even while the data transmission device is transmitting the input data.

For instance, the routing table 22 shown in FIG. 8B and the information table 26 shown in FIG. 8C indicate that the most appropriate route considering a data transmission speed as the first priority for transmitting the input data to the destination X is a route using the AF-PHB. However, in a case in which the network becomes more crowded, the class selection unit 28 changes contents of the routing table 22 as shown in FIG. 10A and the information table 26 as shown in FIG. 10B so that the routing table 22 and the information table 26 indicate that the most appropriate route considering the data transmission speed as the first priority for transmitting the input data to the destination X is a route using the EF-PHB.

As described above, the data transmission device 30 can always select a network most appropriate for a user even in a case in which the network conditions change, by monitoring the network conditions and updating the most appropriate service class even while transmitting the input data in the case in which the network conditions change. The above-described method according to the third embodiment is especially efficient in a case of transmitting data having a long packet length.

Figure 11:
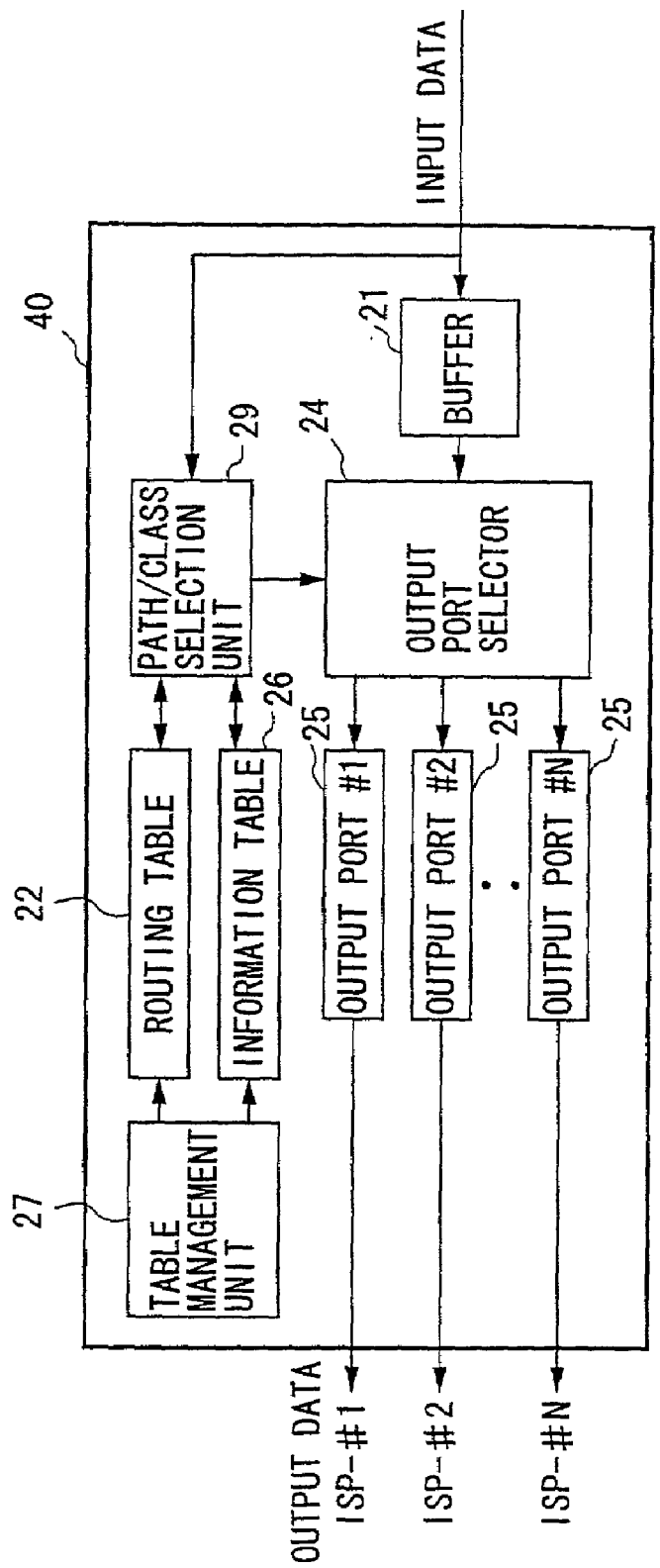
FIG. 11 is a block diagram showing a configuration of a data transmission device according to a fourth embodiment of the present invention.
Figure 12A:
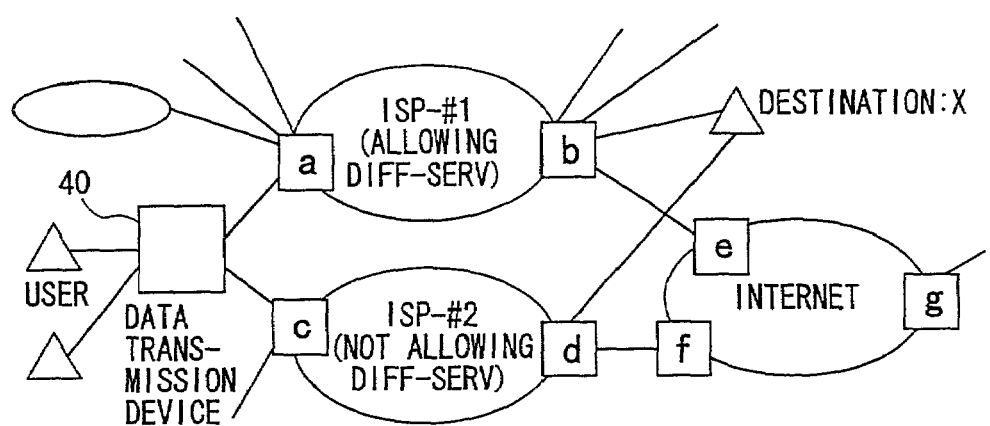

FIG. 11 is a block diagram showing a configuration of a data transmission device according to a fourth embodiment of the present invention. Additionally, FIGS. 12A, 12B and 12C are diagrams respectively showing a data transmission system including the data transmission device, a routing table and an information table, according to the fourth embodiment. A data transmission device 40 shown in FIG. 11 includes the buffer 21, the routing table 22, the output port selector 24, the output ports 25, the information table 26 and the table management unit 27. A unit shown in FIG. 11 having the same unit number as a unit shown in FIG. 4 is equivalent to the unit shown in FIG. 4. Additionally, the data transmission device 40 includes a path/class selection unit 29. The path/class selection unit 29 determines the most appropriate path and service class in the differentiated service by referring to the routing table 22 and the information table 26.

The data transmission device 40 is connected to two ISPs that are the ISP-#1 and the ISP-#2 as shown in FIG. 12A. The ISP-#1 allows the differentiated service, and provides three service classes. The ISP-#2 does not allow the differentiated service, and provides only a single service class. The numbers of ISPs and of service classes are not limited to the above-described numbers. The data transmission device 40 stores static information about all the networks to which the data transmission device 40 is connected such as fee information and contents of service classes, in the information table 26. Additionally, if an ISP discloses dynamic information such as communication traffic information about a network and a service class, the data transmission device 40 also receives the dynamic information periodically, and stores the dynamic information in the information table 26. The routing table 22 shown in FIG. 12B registers a destination of input data, information whether the destination is a host or a network (host/net), a next hop, an output port, a service class, the most appropriate route based on a data transmission speed (the most appropriate route for a speed), and the most appropriate route based on a data transmission fee (the most appropriate route for a fee). It should be noted that the most appropriate route is indicated as the sign " " in the routing table 22. On the other hand, the information table 26 shown in FIG. 12C registers a destination of the input data, information about networks, through which the input data is transmitted ("via" network), a message-packet return period, fee information, a numerical value calculated for the data transmission speed as the first priority (a value for the speed as the first priority), and a numerical value calculated for the data transmission fee as the first priority (a value for the fee as the first priority).

After receiving data whose destination IP address is X from a user terminal device, the data transmission device 40 performs the following processes. The data transmission device 40 initially stores the data as input data in the buffer 21. The path/class selection unit 29 refers to the routing table 22 and the information table 26 based on information such as a port number written in the destination IP address of the input data or an IP header of the input data. By recognizing the port number, the class selection unit 28 can set a service class for each application recognized from the port number. For example, a user can set the path/class selection unit 29 to select a service class that attaches greater importance to the data transmission fee than to the data transmission speed if an application is the FTP, or a service class that attaches the greatest importance to the data transmission speed if the application is to transmit dynamic image data. If the table management unit 27 cannot obtain the dynamic information such as communication traffic information about each network and of each service class because the dynamic information is not disclosed, the table management unit 27 obtains information by the later-described method, and writes the information in the information table 26. Subsequently, the path/class selection unit 29 selects the most appropriate path and service class based on data stored in the routing table 22 and the information table 26, and then selects an output port connected to a data transmission device or a host located at the next hop. The data transmission device 40 rewrites the IP header of the input data if necessary, and outputs the input data stored in the buffer 21 from the output port. It should be noted that the path/class selection unit 29 might be composed of a CPU or exclusive hardware.

The path/class selection unit 29 determines that the input data can be transmitted most quickly by use of the EF-PHB of the ISP-#1, by considering only communication traffic information about a combination of a network and a service class based on the message-packet return period recorded in the information table 26 shown in FIG. 12C. However, by considering a data transmission fee based on the fee information in addition to the communication traffic information, the path/class selection unit 29 may determine that data transmission using the best effort service of the ISP-#2 is the most appropriate. A user may set a weight on each element of information stored in the information table 26 so that the path/class selection unit 29 can determine the most appropriate combination of a path and a service class by following the user's setting.

As described above, the data transmission device 40 can select a combination of a network and a service class most appropriate for a user by including the information table 26, storing the static and dynamic information about each network in the information table 26, and determining the most appropriate path and service class by referring to the static and dynamic information before transmitting the input data. In other words, the present invention provides a method of selecting an appropriate network and an appropriate service class based on static and dynamic information about a plurality of networks and service classes, thereby enabling data transmission by use of the appropriate service class of the appropriate network.

FIGS. 13A and 13B are diagrams respectively showing a routing table and an information table according to a fifth embodiment of the present invention. A configuration of a data transmission device according to the fifth embodiment is the same as that of the data transmission device 40 according to the fourth embodiment, and thus unit numbers of the data transmission device according to the fifth embodiment are equal to those of the data transmission device 40 according to the fourth embodiment. Additionally, the data transmission device 40 according to the fifth embodiment executes selection of the most appropriate combination of a network and a service class, settings and data transmission similarly as the fourth embodiment.

Additionally, in the fifth embodiment, the data transmission device 40 obtains network conditions periodically even while transmitting input data to its destination X. The path/class selection unit 29 periodically determines the most appropriate path and service class by referring to the routing table 22 and the information table 26. If a path and a service class determined as the most appropriate path and service class are different from current settings (a currently selected path and a currently selected service class) as a result of a change in the network conditions, the path/class selection unit 29 changes the path and the service class most appropriate for transmitting the input data in the routing table 22. Subsequently, the data transmission device 40 rewrites the IP header of the input data if necessary, and then transmits the input data.

For instance, the routing table 22 shown in FIG. 12B and the information table 26 shown in FIG. 12C indicate that the most appropriate route considering a data transmission speed as the first priority for transmitting the input data to the destination X is a route using the AF-PHB of the ISP-#1. However, in a case in which the network becomes more crowded, the path/class selection unit 29 changes contents of the routing table 22 as shown in FIG. 13A and the information table 26 as shown in FIG. 13B so that the routing table 22 and the information table 26 indicate that the most appropriate route considering the data transmission speed as the first priority for transmitting the input data to the destination X is a route using the best effort service of the ISP-#2.

As described above, the data transmission device 40 can always select a network and a service class most appropriate for a user even in a case in which the network conditions change, by monitoring the network conditions even while transmitting the input data and updating the most appropriate network and service class in the case of detecting a change in the network conditions. The above-described method according to the fifth embodiment is especially efficient in a case of transmitting data having a long packet length.

Figure 14:
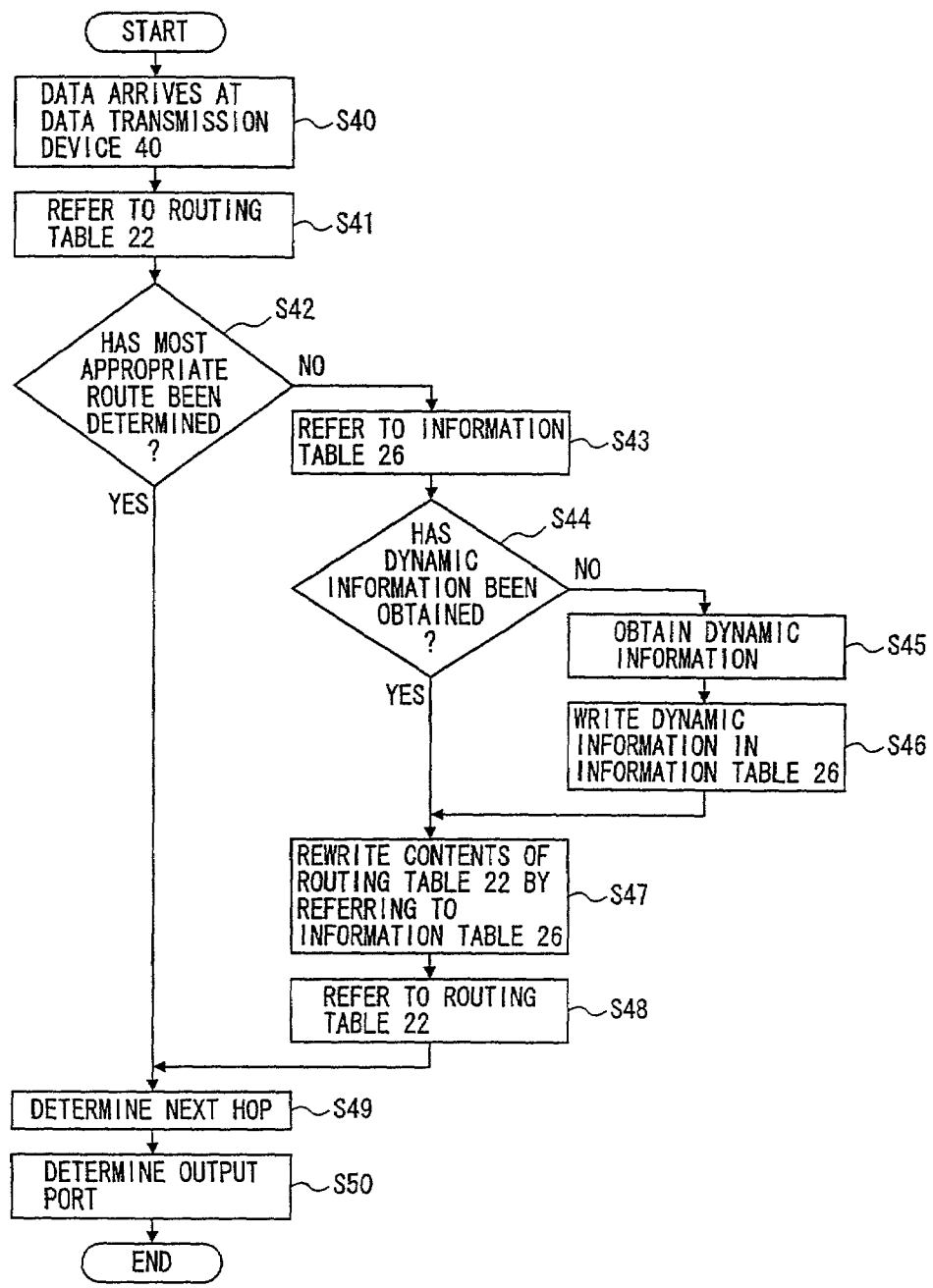
FIG. 14 is a flowchart showing processes performed by a data transmission device according to a sixth embodiment of the present invention.

A description will now be given of a method of referring to the routing table 22 shown in FIG. 12B and the information table 26 shown in FIG. 12C with reference to FIG. 14. FIG. 14 is a flowchart showing processes performed by a data transmission device according to a sixth embodiment of the present invention. Preceding the processes shown in FIG. 14, the data transmission device 40 stores static information such as fee information and contents of service classes of the networks ISP-#1 and ISP-#2 in the information table 26. If an ISP discloses dynamic information such as communication traffic information about the networks, the data transmission device 40 periodically receives the dynamic information, and stores the dynamic information in the information table 26. The most appropriate route stored in the routing table 22 is updated based on the information table 26 every time contents of the information table 26 are changed. If the data transmission device 40 cannot obtain the dynamic information, for instance, because the dynamic information is not disclosed, the most appropriate route is not determined in the routing table 22.

At a step S40 shown in FIG. 14, the data transmission device 40 receives data whose destination is X from a user, and stores the data as input data in the buffer 21. At a step S41, the path/class selection unit 29 determines the most appropriate route by referring to only the routing table 22 based on a destination IP address (X) of the input data. If it is determined at a step S42 that the data transmission device 40 has received the dynamic information and has determined the most appropriate route from the routing table 22, the data transmission device 40 proceeds to a step S49. If it is determined at the step S42 that the data transmission device 40 has not obtained the dynamic information, and thus contents of the routing table 22 have not been fulfilled, the path/class selection unit 29 proceeds to a step S43, and refers to the information table 26. Following the step S43, the data transmission device 40 decides whether the data transmission device 40 has received the dynamic information at a step S44. If it is determined at the step S44 that the data transmission device 40 has received the dynamic information, the data transmission device 40 proceeds to a step S47. If it is determined at the step S44 that the data transmission device 40 has not received the dynamic information, the table management unit 27 obtains the dynamic information at a step S45, and writes the dynamic information in the information table 26 at a step S46.

At the step S47, the table management unit 27 determines the most appropriate route for the routing table 22 by referring to the information table 26, and writes the most appropriate route in the routing table 22. Subsequently, the path/class selection unit 29 determines the most appropriate route by referring to only the routing table 22 based on the destination IP address of the input data at a step S48. At the step S49, the data transmission device 40 determines an output port that is connected to a data transmission device or a host located at the next hop on the most appropriate route based on a result of referring to the routing table 22. At a step S50, the data transmission device 40 transmits the input data stored in the buffer 21 from a selected output port to the data transmission device or the host located at the next hop.

As described above, the data transmission device 40 can always select a network most appropriate for a user by referring to only the routing table 22, by rewriting the most appropriate route stored in the routing table 22 referring to the information table 26. In other words, the present invention provides a method of rewriting a routing table in accordance with dynamic information stored in an information table if the dynamic information changes because of detection of a change in network conditions, thereby enabling selection of an appropriate combination of a network and a service class for a user terminal device, and data transmission using the appropriate combination even if the network conditions change.

Figure 15:
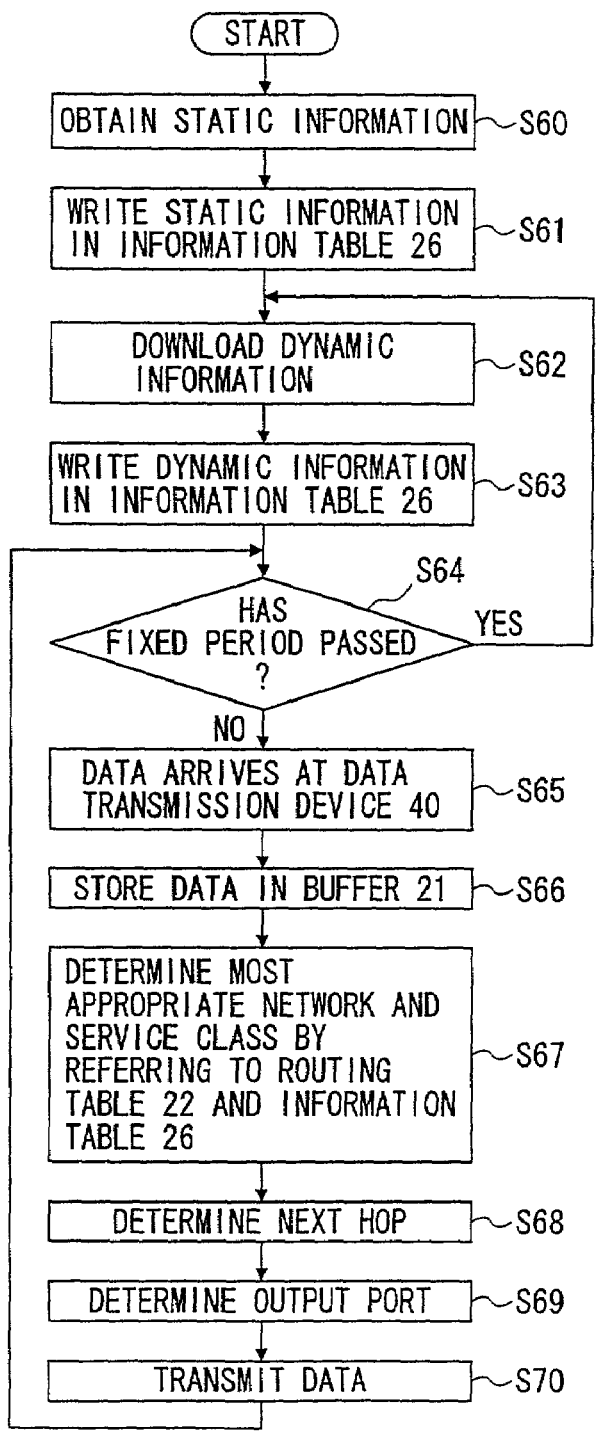
FIG. 15 is a flowchart showing processes performed by a data transmission device according to a seventh embodiment of the present invention.

FIG. 15 is a flowchart showing processes performed by a data transmission device according to a seventh embodiment of the present invention. The seventh embodiment describes a case in which networks connected to a user terminal device disclose dynamic information indicating current network conditions such as communication traffic information about the networks. The table management unit 27 of the data transmission device 40 initially obtains static information such as configurations of the networks at a step S60, and stores the static information in the information table 26 at a step S61. Additionally, at a step S62, the table management unit 27 obtains the dynamic information at a step S62, and stores the dynamic information in the information table 26 at a step S63. Subsequently, at a step S64, the table management unit 27 determines whether a fixed period has passed since the table management unit 27 updated the dynamic information stored in the information table 26. If it is determined at the step S64 that the fixed period has passed, the data transmission device 40 proceeds to the step S62. If it is determined at the step S64 that the fixed period has not passed yet, the data transmission device 40 proceeds to a step S65. The data transmission device 40 receives data from the user terminal device at the step S65, and stores the data as input data in the buffer 21 at a step S66. Subsequently, at a step S67, the path/class selection unit 29 determines the most appropriate path and service class by referring to the routing table 22 and the information table 26. Additionally, the path/class selection unit 29 determines the next hop on the most appropriate path at a step S68, and selects an output port that is connected to a data transmission device or a host located at the next hop on the most appropriate path at a step S69. Subsequently, the data transmission device 40 transmits the input data to the data transmission device or the host located at the next hop at a step S70.

As described above, the data transmission device 40 periodically obtains the dynamic information and stores the dynamic information in the information table 26. In such a case, the data transmission device 40 does not have to transmit a message packet in order to obtain information used for deciding the most appropriate network (path) and service class when receiving the data from the user terminal device, thereby decreasing a delay time occurring when determining the most appropriate network and service class. The present invention provides a method of obtaining dynamic information about a plurality of networks and service classes from information disclosed by the networks, thereby enabling selection of an appropriate combination of a network and a service class for a user terminal device, and data transmission using the appropriate combination even if the network conditions change.

Figure 16:
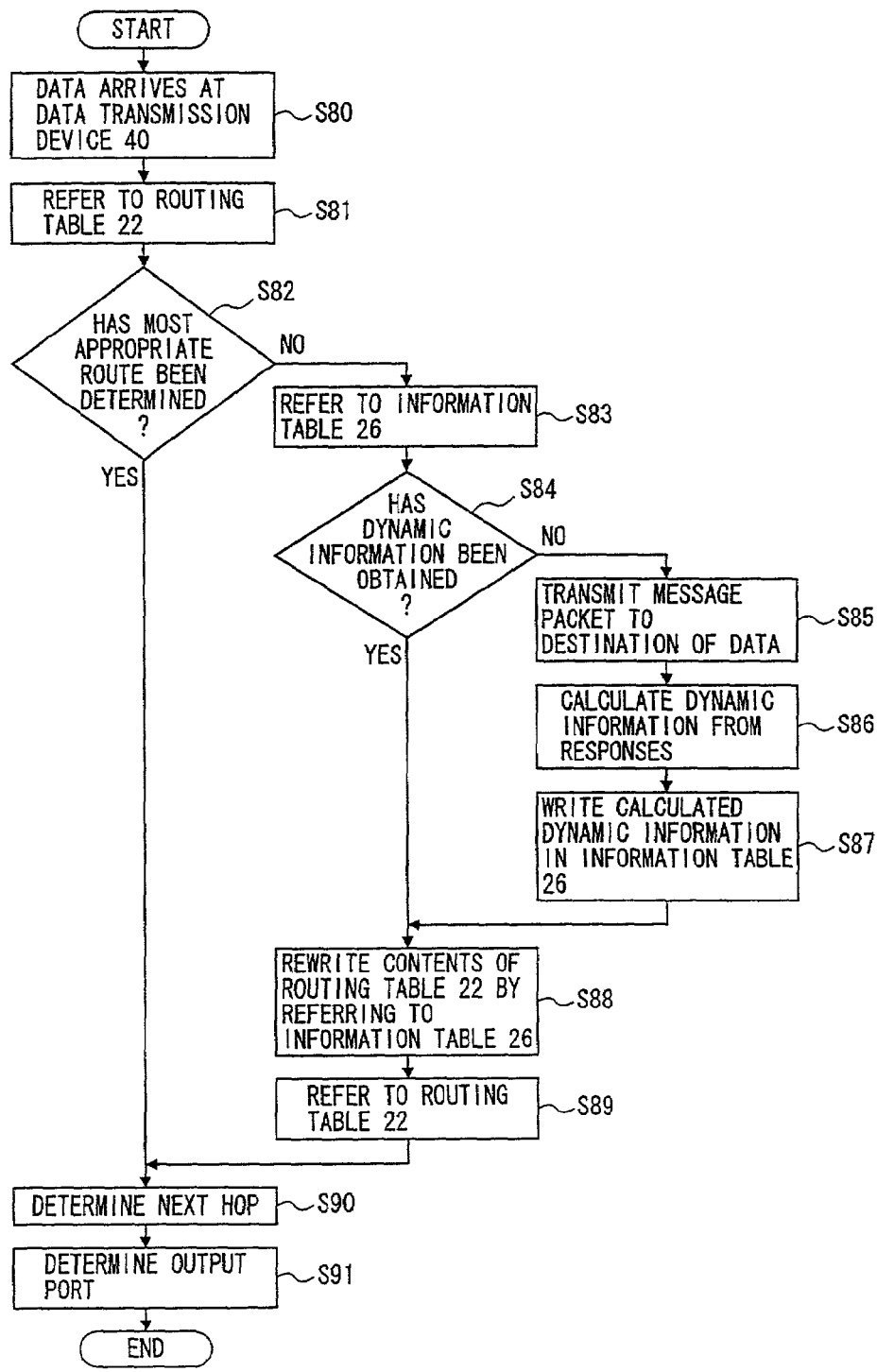
FIG. 16 is a flowchart showing processes performed by a data transmission device according to an eighth embodiment of the present invention.

FIG. 16 is a flowchart showing processes performed by a data transmission device according to an eighth embodiment of the present invention. The eighth embodiment describes a case in which networks connected to a user terminal device do not disclose dynamic information indicating current network conditions such as communication traffic information about the networks.

At a step S80 shown in FIG. 16, the data transmission device 40 receives data whose destination is X from a user, and stores the data as input data in the buffer 21. At a step S81, the path/class selection unit 29 determines the most appropriate route by referring to only the routing table 22 based on a destination IP address (X) of the input data. If it is determined at a step S82 that the data transmission device 40 has received the dynamic information and has determined the most appropriate route from the routing table 22, the data transmission device 40 proceeds to a step S90. If it is determined at the step S82 that the data transmission device 40 has not obtained the dynamic information, and thus contents of the routing table 22 have not been fulfilled, the path/class selection unit 29 proceeds to a step S83, and refers to the information table 26. Following the step S83, the data transmission device 40 decides whether the data transmission device 40 has received the dynamic information at a step S84. If it is determined at the step S84 that the data transmission device 40 has received the dynamic information, the data transmission device 40 proceeds to a step S88. If it is determined at the step S84 that the data transmission device 40 has not received the dynamic information, the data transmission device 40 refers to the routing table 22 for determining all the combinations of service classes and networks connected to the data transmission device 40, and transmits a message packet used for collecting information to the destination IP address X via each combination at a step S85. After receiving responses to the message packet transmitted from the data transmission device 40, the data transmission device 40 calculates the dynamic information about each combination of a service class and a network at a step S86. A method of specifying networks via the transmitted message packet uses source routing that is an IP header option specifying a route through which the input data transmitted from the data transmission device 40 passes to reach its destination.

Subsequently, the table management unit 27 writes calculated dynamic information in the information table 26 at a step S87. At the step S88, the table management unit 27 determines the most appropriate route for the routing table 22 by referring to the information table 26, and writes the most appropriate route in the routing table 22. Subsequently, the path/class selection unit 29 determines the most appropriate route by referring to only the routing table 22 based on the destination IP address of the input data at a step S89. At the step S90, the data transmission device 40 determines an output port that is connected to a data transmission device or a host located at the next hop on the most appropriate route based on a result of referring to the routing table 22. At a step S91, the data transmission device 40 transmits the input data stored in the buffer 21 from a selected output port to the data transmission device or the host located at the next hop.

As described above, the data transmission device 40 can always select a network and a service class most appropriate for a user even if the dynamic information is not disclosed, by obtaining the dynamic information by use of the message packet. The present invention provides a method of collecting dynamic information about a plurality of networks and service classes by transmitting a message packet, thereby enabling collection of the dynamic information even if the networks do not disclose the dynamic information, selection of an appropriate combination of a network and a service class for a user terminal device, and data transmission using the appropriate combination even if network conditions change. A detailed description will be given of the method of obtaining the dynamic information later.

Figure 17A:
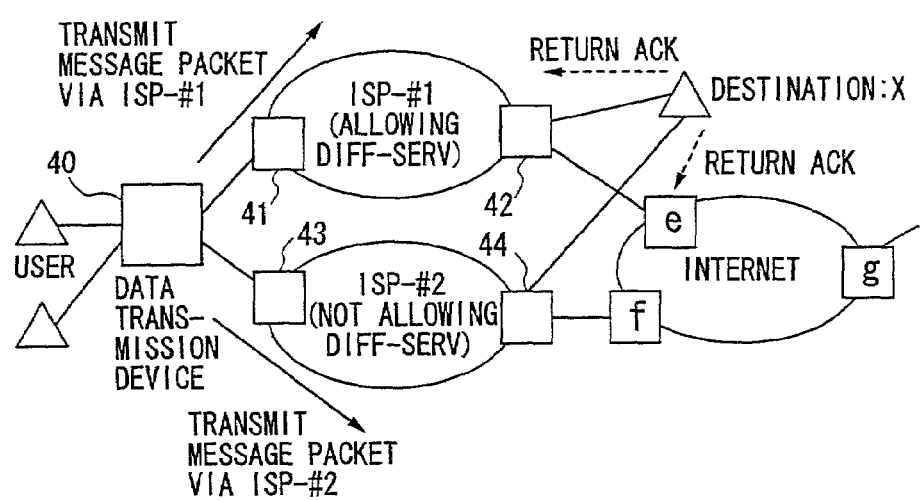
Figure 18:
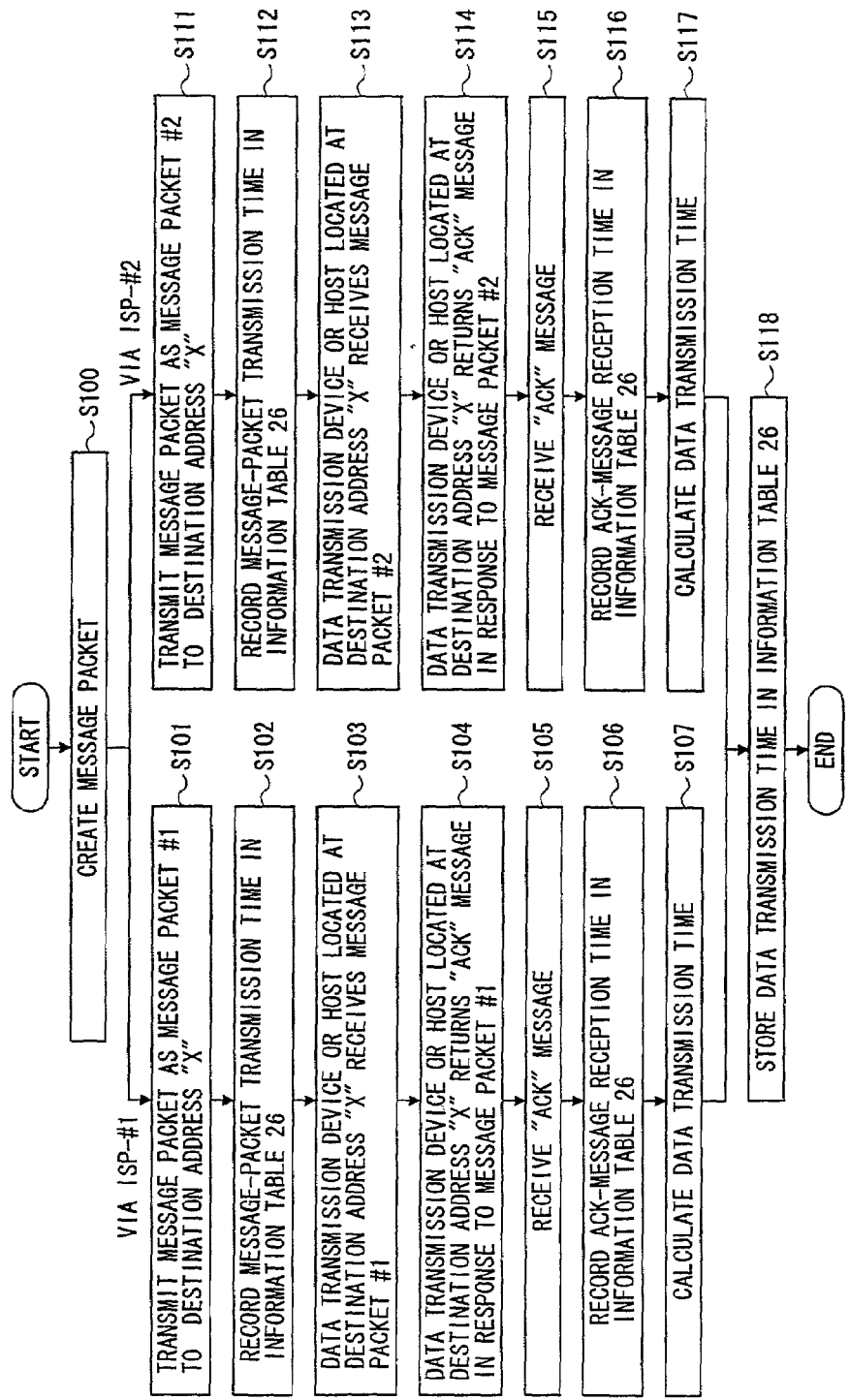
FIG. 18 is a flowchart showing processes performed by the data transmission device according to the ninth embodiment.

FIGS. 17A and 17B are diagrams respectively showing a data transmission system including a data transmission device, and an information table, according to a ninth embodiment of the present invention. Additionally, FIG. 18 is a flowchart showing processes performed by the data transmission device according to the ninth embodiment. The data transmission device 40 is connected to two ISPs that are the ISP-#1 and the ISP-#2 as shown in FIG. 17A. The ISP-#1 allows the differentiated service, and provides three service classes. On the other hand, the ISP-#2 does not allow the differentiated service, and provides only a single service class. The numbers of ISPs and of service classes are not limited to the above-described numbers. The data transmission device 40 stores static and dynamic information about all the networks connected to the data transmission device 40 in the information table 26. The static information includes, for instance, fee information and contents of service classes of the networks. The dynamic information includes communication traffic information about the networks.

If information about communication traffic of the networks is not disclosed, the data transmission device 40 performs the following processes shown in FIG. 18. In such a case, the data transmission device 40 initially creates a message packet at a step S100 shown in FIG. 18. Subsequently, the data transmission device 40 transmits the message packet to the destination IP address X of the input data via each service class and each network connected to the data transmission device 40 by referring to the routing table 22. For example, the data transmission device 40 transmits the message packet as a message packet #1 via data transmission devices 41 and 42 located in the ISP-#1 to the destination IP address X at a step S101 as well as transmits the message packet as a message packet #2 via data transmission devices 43 and 44 located in the ISP-#2 to the destination IP address X at a step S111.

The following processes are performed with respect to the transmission of the message packet #1. When transmitting the message packet #1, the data transmission device 40 records a message-packet transmission time indicating a time at which the message packet #1 is transmitted by the data transmission device 40, in the information table 26 at a step S102. In a case in which a TCP/IP (Transmission Control Protocol/Internet Protocol) communication method is applied to the transmission of the message packet #1, after receiving the message packet #1 at a step S103, a data transmission device or a host located at the destination IP address X returns an ACK (Acknowledgement) message or signal to the data transmission device 40 at a step S104. At a step S105, the data transmission device 40 receives the ACK message transmitted from the data transmission device or the host located at the destination IP address X. Subsequently, the data transmission device 40 records an ACK-message reception time indicating a time at which the data transmission device 40 receives the ACK message in the information table 26 at a step S106, and calculates a difference between the ACK-message reception time and the message-packet transmission time at a step S107. Similarly, steps S112 through S117 are executed. It should be noted that the steps S101 through S107 and the steps S111 through S117 are executed simultaneously.

Additionally, the data transmission device 40 stores the difference between the message-packet transmission time and the ACK-message reception time as a data transmission time indicating a period of time taken for data to be transmitted from the data transmission device 40 to the data transmission device or the host located at the destination IP address X, in the information table 26 at a step S118. Consequently, the path/class selection unit 29 refers to each data transmission time as communication traffic information about a network. The shorter the data transmission time is, the less communication traffic of the network is.

As described above, the data transmission device 40 can obtain information about communication traffic of each network connected to the data transmission device 40 even if the information is not disclosed, by utilizing the ACK message of the TCP certainly used in the TCP/IP communication. Additionally, the utilization of the ACK message for obtaining the information may be easily applied to an existing data transmission device. The present invention provides a method of obtaining communication traffic information about networks as dynamic information about the networks connected to a destination by transmitting a message packet to the destination and by receiving an acknowledgement from the destination in response to the message packet in a TCP/IP communication, thereby enabling selection of an appropriate combination of a network and a service class for a user terminal device, and data transmission using the appropriate combination even if network conditions change.

Figure 19A:
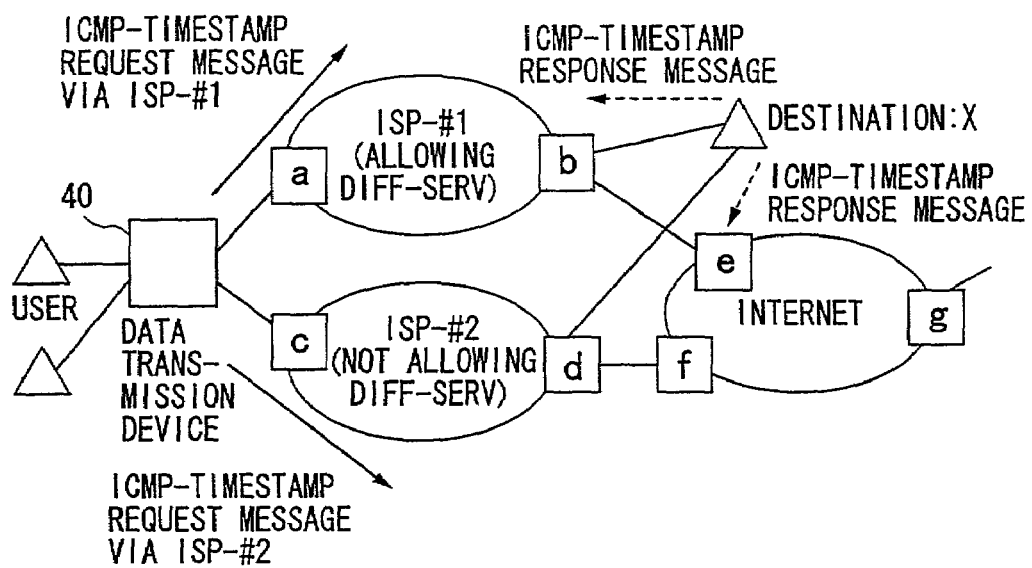

FIGS. 19A and 19B are diagrams respectively showing a data transmission system including a data transmission device, and an IP header of a message packet, according to a tenth embodiment of the present invention. Additionally, FIG. 20 is a flowchart showing processes performed by the data transmission device according to the tenth embodiment. The data transmission device 40 is connected to two ISPs that are the ISP-#1 and the ISP-#2 as shown in FIG. 19A. The ISP-#1 allows the differentiated service, and provides three service classes. On the other hand, the ISP-#2 does not allow the differentiated service, and provides only a single service class. The numbers of ISPs and of service classes are not limited to the above-described numbers. The data transmission device 40 stores static and dynamic information about all the networks connected to the data transmission device 40 in the information table 26. The static information includes, for instance, fee information and contents of service classes of the networks. The dynamic information includes communication traffic information about the networks.

If information about communication traffic of the networks is not disclosed, the data transmission device 40 performs the following processes shown in FIG. 20. In such a case, the data transmission device 40 initially creates a message packet corresponding to timestamp request and response messages at a step S120. In the tenth embodiment, an ICMP (Internet Control Message Protocol) timestamp request and response messages are used for obtaining a response time of a network. Such an ICMP message packet includes an IP header shown in FIG. 19B.

Subsequently, for each service class and network connected to the data transmission device 40, the data transmission device 40 writes a request-message transmission time indicating a time at which the data transmission device 40 starts transmitting the ICMP message packet, in an originate timestamp field of the IP header of the ICMP message packet at steps S121 and S131. The data transmission device 40 then transmits the ICMP message packet to a data transmission device or a host located at the destination IP address X of the input data via each service class and each network connected to the data transmission device 40 by referring to the routing table 22. For example, the data transmission device 40 transmits the ICMP message packet as an ICMP message packet #1 via data transmission devices "a" and "b" located in the ISP-#1 to the destination IP address X at a step S122 as well as transmits the ICMP message packet as an ICMP message packet #2 via data transmission devices "c" and "d" located in the ISP-#2 to the destination IP address X at a step S132.

The following processes are performed with respect to the transmission of the ICMP message packet #1. When receiving the ICMP message packet #1 from the data transmission device 40 at a step S123, the data transmission device or the host located at the destination IP address X writes a request-message reception time indicating a time at which the data transmission device or the host located at the destination IP address X receives the ICMP message packet #1, in a receive timestamp field of the IP header of the ICMP message packet #1 at a step S124. Subsequently, at a step S125, the data transmission device or the host located at the destination IP address X writes a response-message transmission time indicating a time at which the data transmission device or the host located at the destination IP address X starts transmitting the ICMP message packet #1 to the data transmission device 40, in a transmit timestamp field of the IP header of the ICMP message packet #1. At a step S126, the data transmission device or the host located at the destination IP address X transmits the ICMP message packet #1 to the data transmission device 40.

After receiving the ICMP message packet #1 at a step S127, the data transmission device 40 obtains a data transmission time indicating a period of time taken for transmitting data from the data transmission device 40 to the data transmission device or the host located at the destination IP address X by calculating a difference between time data stored in the originate timestamp field and in the receive timestamp field of the IP header of the ICMP message packet #1 at a step S128. Similarly, steps S133 through S138 are executed. It should be noted that the steps S121 through S128 and the steps S131 through S138 are executed simultaneously. Additionally, the data transmission device 40 stores the data transmission time in the information table 26 at a step S139. Consequently, the path/class selection unit 29 refers to each data transmission time as communication traffic information about a network. The shorter the data transmission time is, the less communication traffic of the network is.

As described above, the data transmission device 40 can obtain information about communication traffic of each network connected to the data transmission device 40 even if the information is not disclosed, by utilizing the ICMP timestamp request and response messages. Additionally, the utilization of the ICMP timestamp request and response messages for obtaining the information may be easily applied to an existing data transmission device. The present invention provides a method of obtaining communication traffic information about networks as dynamic information about the networks connected to a destination from a timestamp of an ICMP timestamp response message by transmitting an ICMP timestamp request message to the destination, and by receiving the ICMP timestamp response message from the destination, thereby enabling selection of an appropriate combination of a network and a service class for a user terminal device, and data transmission using the appropriate combination even if network conditions change.

Figure 21:
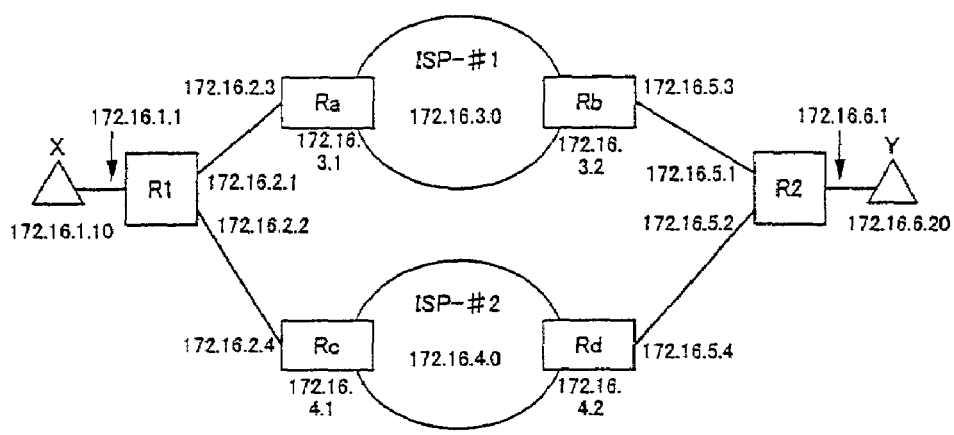
FIG. 21 is a diagram showing a data transmission system including a data transmission device according to an eleventh embodiment of the present invention.

FIG. 21 is a diagram showing a data transmission system including a data transmission device according to an eleventh embodiment of the present invention. According to the eleventh embodiment, the data transmission device is a router R1. Additionally, the data transmission system shown in FIG. 21 includes hosts X and Y, and routers Ra, Rb, Rc, Rd and R2. The routers Ra and Rb are provided respectively at an entrance and an exit of the ISP-#1. The routers Rc and Rd are provided respectively at an entrance and an exit of the ISP-#2. Furthermore, the router R2 is connected to the host Y. Each of the hosts and routers has an IP address as shown in FIG. 21.

The eleventh embodiment describes a case in which the host X transmits data to the host Y. Additionally, it is assumed that communication traffic information about each network in the data transmission system is not disclosed in the eleventh embodiment. In order to simplify a description, only fee information and the communication traffic information about each network are considered respectively as static information and dynamic information. The router R1 currently includes the information table 26 shown in FIG. 22A and the routing table 22 shown in FIG. 22B. The information table 26 shown in FIG. 22A includes no data in its message-packet return period field since the communication traffic information about each network is not disclosed. Thus, the most appropriate route from the host X to the host Y is not determined in the routing table 22 shown in FIG. 22B.

A description will now be given of a method of determining the most appropriate route according the eleventh embodiment. The host X initially writes an IP address of the host Y (172.16.6.20) in a destination IP address field of an IP header of data whose destination is the host Y, and transmits the data to the router R1. The router R1 receives the data from the host X, and stores the data in the buffer 21. Additionally, the router R1 determines data transmission routes to the host Y by referring to the routing table 22. For instance, the router R1 determines a route via the router Ra (172.16.2.3) and the ISP-#1, and a route via the router Rc (172.16.2.4) and the ISP-#2 as the data transmission routes to the host Y, based on the last row of the routing table 22. Subsequently, the router R1 creates a message packet, and transmits the message packet to the host Y via the ISP-#1 and via the ISP-#2 by use of a source routing method. In the eleventh embodiment, the router R1 utilizes ICMP timestamp request and response messages for collecting information about the communication traffic information about each network.

FIGS. 23A and 23B are diagrams respectively showing an ICMP message packet transmitted through the ISP-#1 and an ICMP message packet transmitted through the ISP-#2. A number "01" written in a protocol type field of the ICMP message packet indicates an ICMP. The source routing method includes a strict source routing method and a loose source routing method. A number "10000011" written in an option type field indicates the loose source routing method. In the loose source routing method, the ICMP message packet may be transmitted through a path using other intermediate routers to the next addresses such as an address 1, an address 2 and an address 3 written in a source route option field of the ICMP message packet. In other words, the ICMP message packet may be transmitted from the ISP-#1 (172.16.3.0) to the host Y (172.16.6.20) through a single router or a plurality of routers. In the strict source routing method, the ICMP message packet must be transmitted directly, for example, from the address 1 to the address 2, or from the address 2 to the address 3. If the ICMP message packet cannot be transmitted directly, such an ICMP message packet is discarded. Additionally, if a field of the ICMP message packet does not indicate a code number, a number appropriate to data stored in the field is written.

After receiving the ICMP message packet from the router R1, the router Ra recognizes that a source routing method is the loose source routing method by referring to the number "10000011" stored in the option type field of the ICMP message packet. Additionally, by referring to the source route option field of the ICMP message packet, the router Ra recognizes that the address 2 in the source route option field indicates an IP address of the router Ra, and that the next source route is the host Y. Accordingly, the router Ra determines a data transmission path to the host Y by referring to its routing table 22 shown in FIG. 24A. Since the loose source routing method is applied to the transmission of the ICMP message packet, the ICMP message packet is not discarded even if the router Ra cannot find a direct path to the host Y. Consequently, the router Ra determines the router Rb as the next hop based on its routing table 22. Subsequently, the router Ra makes a pointer pointing to the next source route to point to the address 3, and transmits the ICMP message packet from its output port 2 to the router Rb.

The router Rb receives the ICMP message packet from the router Ra, and determines that the loose source routing method is applied to the transmission of the ICMP message packet. Subsequently, the router Rb refers to its routing table 22 shown in FIG. 24B to determine a data transmission path to the host Y as the next source route similarly since an IP address of the router Rb is not shown in the source route option field of the ICMP message packet. Consequently, the router Rb recognizes the router R2 as the next hop by referring to the routing table 22 shown in FIG. 24B, and thus transmits the ICMP message packet to the router R2 from its output port 2.

The router R2 receives the ICMP message packet from the router Rb, and refers to its routing table 22 shown in FIG. 24C similarly to determine a data transmission path to the host Y. Consequently, the router R2 determines that the host Y is located on a direct transmission path from the router R2, and thus transmits the ICMP message packet to the host Y from its output port 3.

The host Y receives the ICMP message packet from the router R2, and recognizes that the destination of the ICMP message packet is the host Y. After detecting the ICMP message packet is an ICMP timestamp request message, the host Y records a request-message reception time indicating a time at which the host Y receives the ICMP message from the router R2 in a receive timestamp field of the ICMP message packet as well as changes an ICMP type field from "0D" to "0E" keeping an identifier field and a sequence number field as they have been. Subsequently, the host Y writes a response-message transmission time indicating a time at which the host Y starts transmitting the ICMP message packet back to the router R1 in a transmit timestamp field of the ICMP message packet right before transmitting the ICMP message packet, adds an IP header to the ICMP message packet, and then transmits the ICMP message packet toward the router R1.

The ICMP message packet is transmitted back to the router R1 without specifying the source routing method. However, the router R1 can obtain a data transmission time by calculating a difference between time data stored in the originate timestamp field and the receive timestamp field of the ICMP message packet after receiving the ICMP message packet, and thus the ICMP may be transmitted back to the router R1 through any data transmission path. After receiving the ICMP message packet, the router R1 corresponds the ICMP message packet transmitted to the host Y (ICMP timestamp request message) and the ICMP message transmitted from the host Y (ICMP timestamp response message) by use of the identifier field and the sequence number field of the ICMP message packet. Accordingly, the router R1 can ascertain that the ICMP message packet transmitted from the host Y is the ICMP timestamp response message responding to the ICMP message packet transmitted as the ICMP timestamp request message from the router R1. The router R1 then obtains the data transmission time by calculating the difference between the time data stored in the originate timestamp field and the receive timestamp field of the ICMP message packet, and stores the data transmission time as information about communication traffic of the route via ISP-#1 in its information table 26. Similarly, the router R1 obtains information about communication traffic of the route via the ISP-#2, and stores the information in the information table 26. After executing the above-described processes, the router R1 includes the information table 26 shown in FIG. 25B.

After updating the information table 26, the router R1 also updates the routing table 22 based on the information table 26, as shown in FIG. 25C. The routing table shown in FIG. 25C indicates that data transmission via the ISP-#1 is faster than data transmission via the ISP-#2. Therefore, the router R1 refers to the routing table 22 in order to determine a data transmission path for the data stored in the buffer 21, and then outputs the data to the router Ra in order to transmit the data to the host Y via the ISP-#1.

As described above, the router R1 or the data transmission device 40 can select the most appropriate network for a user. In other words, the present invention provides a method of selecting an appropriate network based on static and dynamic information about a plurality of networks, thereby enabling data transmission through the appropriate network.

Figure 26:
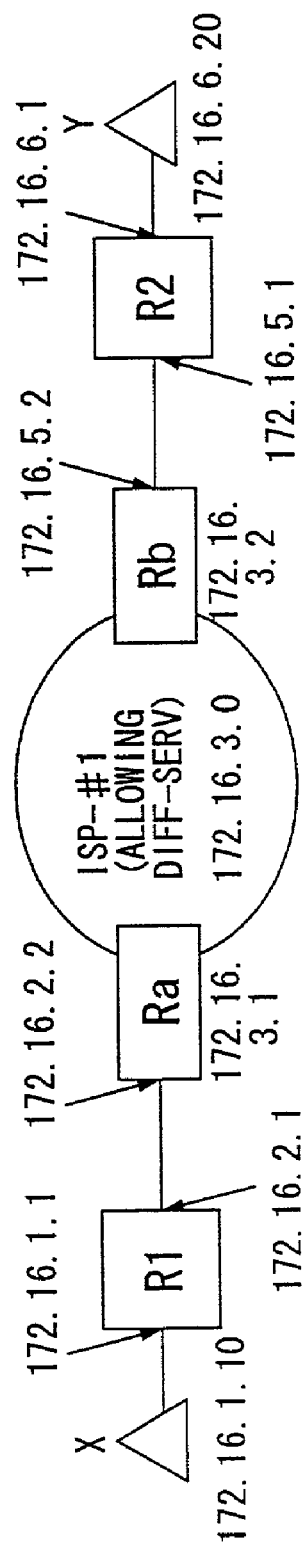
FIG. 26 is a diagram showing a data transmission system including a data transmission device according to a twelfth embodiment of the present invention.

FIG. 26 is a diagram showing a data transmission system including a data transmission device according to a twelfth embodiment of the present invention. In FIG. 26, the router R1 is the data transmission device according to the present invention, and is connected to the ISP-#1 having a plurality of service classes. The routers Ra and Rb are provided as data transmission devices respectively at the entrance and the exit of the ISP-#1. Additionally, the router R2 is provided as a data transmission device connected to the host Y. The hosts X and Y, and the routers R1, R2, Ra and Rb have IP addresses as shown in FIG. 26. The ISP-#1 allows the differentiated service, and contracts with the router R1 in three service classes, which are the EF-PHB, the AF-PHB and the best effort. For a description purpose, it is assumed that the AF-PHB only includes one class. It is also assumed that a user transmits data by setting a data transmission speed as the first priority if the data is real-time data, or by setting a data transmission fee as the first priority if the user transmits the data by use of the FTP. Additionally, the communication traffic information about the networks is not disclosed in the data transmission system shown in FIG. 26. The data is determined as the real-time data by use of a port number of the TCP if the data is transmitted through the TCP-IP communication. For example, a number "5004" is registered as a port number of a RTP used for transmitting dynamic image data. In the twelfth embodiment, only fee information and communication traffic information about networks are considered respectively as static information and dynamic information for the description purpose.

A description will now be given of a case in which the user transmits the data from the host X to the host Y. FIGS. 27A and 27B are diagrams respectively showing an information table and a routing table of the router R1, according to the twelfth embodiment. The information table 26 shown in FIG. 27A includes no data in its message-packet return period field since communication traffic information about each network is not disclosed. Thus, the most appropriate route from the host X to the host Y is not determined in the routing table 22 shown in FIG. 27B. The host X initially writes the IP address of the host Y (172.16.6.20) in a destination IP address field of an IP header of data whose destination is the host Y, and transmits the data to the router R1. The router R1 receives the data from the host X, and stores the data in the buffer 21. Additionally, the router R1 determines a data transmission route to the host Y by referring to the routing table 22. For instance, the router R1 determines a route via the router Ra (172.16.3.1) and the ISP-#1 based on referring to the routing table 22. Subsequently, the router R1 creates a message packet, and transmits the message packet to the router Ra by use of each service class. In the twelfth embodiment, the router R1 utilizes the ICMP timestamp request and response messages for collecting information about communication traffic of each network.

FIGS. 28A, 28B and 28C are diagrams showing ICMP message packets created by the router R1 according to the twelfth embodiment. The ICMP message packets shown in FIGS. 28A, 28B and 28C respectively include a code indicating the EF-PHB, a code indicating the AF-PHB and a code indicating the best effort in their TOS (Type Of Service) fields. Since there is only a single data transmission path via the ISP-#1 in the data transmission system shown in FIG. 26, a source routing method is not applied to each ICMP message packet. A number "01" written in a protocol type field of each ICMP message packet indicates an ICMP. Other fields not indicating code numbers include numbers corresponding to the data transmitted from the host X.

After receiving the ICMP message packet shown in FIG. 28A from the router R1 through the EF-PHB, the router Ra determines the router Rb as the next hop on the data transmission path to the host Y by referring to the routing table 22 shown in FIG. 29A. The routing table 22 does not indicate the most appropriate service class. However, the router Ra can recognize that the ICMP message packet received from the router R1 is to be transmitted through the EF-PHB, based on the IP header of the ICMP message packet. The router Ra then transmits the ICMP message packet to the router Rb from its output port 2 via the EF-PHB.

The router Rb receives the ICMP message packet from the router Ra, and then refers to its own routing table 22 shown in FIG. 29B in order to determine the data transmission path to the host Y. The router Rb determines the router R2 as the next hop on the data transmission path to the host Y by referring to the routing table shown in FIG. 29B, and transmits the ICMP message packet to the router R2 from its output port 2 via the EF-PHB. The router R2 receives the ICMP packet from the router Rb, and then determines that the host Y is on a direct data transmission path from the router R2 by referring to its routing table 22 shown in FIG. 29C. Subsequently, the router R2 transmits the ICMP message packet to the host Y from its output port 2 via the EF-PHB.

After receiving the ICMP message packet from the router R2, the host Y detects that the destination of the ICMP message packet is the host Y by referring to the IP header of the ICMP message packet. In a case of detecting the ICMP message packet as an ICMP timestamp request message, the host Y records a request-message reception time indicating a time at which the host Y receives the ICMP message from the router R2 in a receive timestamp field of the ICMP message packet as well as changes an ICMP type field from "0D" to "0E" keeping an identifier field and a sequence number field as they have been. Subsequently, the host Y writes a response-message transmission time indicating a time at which the host Y starts transmitting the ICMP message packet back to the router R1 in a transmit timestamp field of the ICMP message packet right before transmitting the ICMP message packet, adds an IP header to the ICMP message packet, and then transmits the ICMP message packet as an ICMP timestamp response message toward the router R1. The ICMP timestamp response message is transmitted back to the router R1 by a similar method as described above. FIG. 30A shows the ICMP timestamp response message returned from the router Ra to the router R1. The ICMP timestamp response message does not have to be returned to the router RI through the service class EF-PHB, but, instead, possibly through the service class "best effort", since a period taken for returning to the router R1 is not necessary for calculation of a data transmission time.

After receiving the ICMP message packet, the router R1 corresponds the ICMP message packet transmitted to the host Y (ICMP timestamp request message) and the ICMP message transmitted from the host Y (ICMP timestamp response message) by use of the identifier field and the sequence number field of the ICMP message packet. Accordingly, the router R1 can ascertain that the ICMP message packet transmitted from the host Y is the ICMP timestamp response message responding to the ICMP message packet transmitted as the ICMP timestamp request message from the router R1. The router R1 then obtains the data transmission time by calculating a difference between time data stored in the originate timestamp field and the receive timestamp field of the ICMP message packet, and stores the data transmission time as information about communication traffic of the EF-PHB in its information table 26. Similarly, the router R1 obtains information about communication traffic of the other two service classes, which are the AF-PHB and the best effort. Subsequently, the router R1 stores the information in the information table 26. After executing the above-described processes, the router R1 includes the information table 26 shown in FIG. 30B. After updating the information table 26, the router R1 also updates the routing table 22 based on the information table 26, as shown in FIG. 30C. The routing table shown in FIG. 30C indicates that data transmission through the EF-PHB is the fastest. Therefore, the router R1 refers to the routing table 22 in order to determine a data transmission path for the data stored in the buffer 21, and then outputs the data to the router Ra in order to transmit the data to the host Y through the EF-PHB.

As described above, the router R1 or the data transmission device 40 can select the most appropriate network for a user. In other words, the present invention provides a method of selecting an appropriate service class based on static and dynamic information about a plurality of networks, thereby enabling data transmission by use of the appropriate service class.

The router R1 can update the information table 26 while transmitting data to the host Y by transmitting the ICMP message packet through each service class to the host Y, for instance, every five minutes, and by collecting communication traffic information about each service class. If the most appropriate service class becomes different from a currently used service class because of the update of the information table 26, the router R1 interrupts data transmission, and stores the data in the buffer 21. Subsequently, the router R1 updates the currently used service class to the most appropriate service class by rewriting the TOS field of the IP header of the data. After rewriting the TOS field, the router R1 resumes the data transmission by use of the updated service class. The above-described method is especially efficient for transmitting data having a long packet length.

According to the above-described embodiments, the present invention provides a method of automatically selecting a network used for the most efficient data transmission without a user setting even if the network does not disclose dynamic information, by monitoring communication traffic of the network. Additionally, the present invention provides a method of automatically selecting a service class most appropriate for the data transmission in accordance with communication traffic of the service class. Thus, the present invention can decrease a burden on a user.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-028432, filed on Feb. 4, 2000, the entire contents of which are hereby incorporated by reference.

What is claimed is:

1. A data transmission apparatus transmitting data received from a user terminal device through a plurality of networks to a destination, said user terminal device executing communication using an Internet protocol, said data transmission apparatus comprising:
   a routing table storing information relating a destination address of the data and addresses of the plurality of networks;
   an information table storing static and dynamic information about the plurality of networks, said dynamic information including information provided from an external information source; and
   a selection unit automatically selecting at least one of the plurality of networks, so that the data can be transmitted to the destination rapidly, based on an overall status of each of the networks derived from said static and dynamic information.

2. The data transmission apparatus as claimed in claim 1, wherein said information table stores the static and dynamic information about a plurality of service classes included in a network, wherein said selection unit selects one or the plurality of service classes, through which said data transmission apparatus transmits the data to the destination, based on said static and dynamic information about the plurality of service classes.

3. The data transmission apparatus as claimed in claim 1, wherein a part or all of the plurality of networks include a plurality of service classes, wherein said selection unit selects a service class included in a network, through which said data transmission apparatus transmits the data to the destination, based on the static and dynamic information about the plurality of networks and of the plurality of service classes.

4. The data transmission apparatus as claimed in claim 3, further comprising a monitoring unit monitoring conditions of said plurality of networks, wherein said selection unit changes the service class if said monitoring unit detects a change in the conditions of said plurality of networks.

5. The data transmission apparatus as claimed in claim 4, further comprising a rewriting unit rewriting said routing table by referring to said information table if the dynamic information stored in said information table is changed as a result of detection of the change in the conditions of said plurality of networks.

6. The data transmission apparatus as claimed in claim 4, wherein said monitoring unit obtains the dynamic information about said plurality of networks from network information disclosed by said plurality of networks.

7. The data transmission apparatus as claimed in claim 4, wherein said monitoring unit obtains the dynamic information about said plurality of networks by transmitting a packet for collecting network information.

8. The data transmission apparatus as claimed in claim 7, wherein said monitoring unit transmits a message packet to the destination for collecting the network information, receives an acknowledgement from the destination in response to the message packet, and obtains communication traffic information about the plurality of networks as the dynamic information about the plurality of networks to the destination, in an TCP/IP (Transmission Control Protocol/Internet Protocol) communication.

9. The data transmission apparatus as claimed in claim 1, wherein the dynamic information includes information about a data transmission speed and data transmission fee of each of the plurality of networks, and the selection unit selects at least one of the plurality of networks, considering a priority between a data transmission speed and a data transmission fee.

10. A data transmission apparatus transmitting data received from a user terminal device through a plurality of networks to a destination, said user terminal device executing communication using an Internet protocol, said data transmission apparatus comprising:
    a routing table storing information relating a destination address of the data and addresses of the plurality of networks;
    an information table storing static and dynamic information about the plurality of networks; and
    a selection unit selecting at least one of the plurality of networks, through which said data transmission apparatus transmits the data to the destination, based on said static and dynamic information;
    wherein a part or all of the plurality of networks include a plurality of service classes,
    wherein said selection unit selects a service class included in a network, through which said data transmission apparatus transmits the data to the destination, based on the static and dynamic information about the plurality of networks and of the plurality of service classes;
    said data transmission apparatus further comprising:
    a monitoring unit monitoring conditions of said plurality of networks,
    wherein said selection unit changes the service class if said monitoring unit detects a change in the conditions of said plurality of networks, wherein said monitoring unit obtains the dynamic information about said plurality of networks by transmitting a packet for collecting network information, and
    wherein said monitoring unit transmits an ICMP (Internet Control Message Protocol) timestamp request message to the destination, receives an ICMP timestamp response message from the destination, and obtains communication traffic information about the plurality of networks as the dynamic information about the plurality of networks to the destination from a timestamp of the ICMP timestamp response message.

11. A method of transmitting data from a user terminal device through a plurality of networks to a destination, said user terminal device executing communication using an Internet protocol, said method comprising the steps of:
    storing information relating a destination address of the data and addresses of the plurality of networks in a routing table;
    storing static and dynamic information about the plurality of networks in an information table, said dynamic information including information provided from an external information source, and
    automatically selecting at least one of the plurality of networks, so that the data can be transmitted to the destination rapidly, based on an overall status of each of the networks derived from said static and dynamic information.

12. The method as claimed in claim 11, comprising the steps of:
   storing the static and dynamic information about a plurality of service classes included in a network, in said information table; and
   selecting at least one of the plurality of service classes, trough which the data is transmitted to the destination, based on said static and dynamic information about the plurality of service classes.

13. A transmission apparatus transmitting data received from a user terminal through at plurality of networks to a destination, said user terminal executing communication using an Internet protocol, said transmission apparatus comprising:
   means for storing information relating a destination address of the data and addresses of the plurality of networks;
   means for storing static and dynamic information about the plurality of networks, said dynamic information including information provided from an external information source; and
   means for automatically selecting at least one of the plurality of networks, so that the data can be transmitted to the destination rapidly, based on an overall status of each of the networks derived from said static and dynamic information.

* * * * *